United States Patent
Hwang et al.

(10) Patent No.: US 12,167,266 B2
(45) Date of Patent: Dec. 10, 2024

(54) CROSS LINK INTERFERENCE MEASUREMENT

(71) Applicant: LG Electronics Inc., Seoul (KR)

(72) Inventors: Jinyup Hwang, Seoul (KR); Yoonoh Yang, Seoul (KR); Sangwook Lee, Seoul (KR); Suhwan Lim, Seoul (KR); Manyoung Jung, Seoul (KR); Jongkeun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 326 days.

(21) Appl. No.: 17/439,929

(22) PCT Filed: Mar. 18, 2020

(86) PCT No.: PCT/KR2020/003680
§ 371 (c)(1),
(2) Date: Sep. 16, 2021

(87) PCT Pub. No.: WO2020/204405
PCT Pub. Date: Oct. 8, 2020

(65) Prior Publication Data
US 2022/0191724 A1 Jun. 16, 2022

(30) Foreign Application Priority Data

Mar. 29, 2019 (KR) .................. 10-2019-0037284
Apr. 1, 2019 (KR) .................. 10-2019-0037926

(51) Int. Cl.
*H04W 24/10* (2009.01)
*H04B 17/336* (2015.01)
*H04L 5/00* (2006.01)

(52) U.S. Cl.
CPC .......... *H04W 24/10* (2013.01); *H04B 17/336* (2015.01); *H04L 5/0051* (2013.01)

(58) Field of Classification Search
CPC .............. H04W 24/10; H04W 56/004; H04W 56/0005; H04W 72/12; H04B 17/336; H04L 5/0051; H04L 5/0048; Y02D 30/70; H04J 11/00
See application file for complete search history.

(56) References Cited

U.S. PATENT DOCUMENTS

2017/0367073 A1 12/2017 Murugan et al.
2020/0213052 A1* 7/2020 Li .................. H04W 72/23

OTHER PUBLICATIONS

CMCC, "Discussion on UE-UE cross link interference measurements," R1-1902332, 3GPP TSG RAN WG1 #96, Athens, Greece, dated Feb. 25-Mar. 1, 2019, 6 pages.

(Continued)

*Primary Examiner* — Jianye Wu
(74) *Attorney, Agent, or Firm* — Fish & Richardson P.C.

(57) ABSTRACT

One embodiment in the present specification provides a method of performing a measurement by a first device. The method may comprise: a step of transmitting, to a serving cell, capability information with regard to reception of a downlink signal transmitted from the serving cell and a sounding reference signal (SRS) transmitted from a second device; and a step of performing a cross link interference (CLI) measurement on the basis of the SRS from the second device.

18 Claims, 18 Drawing Sheets

(56) References Cited

OTHER PUBLICATIONS

Ericsson, "Remaining issues for CLI measurement and reporting," R1-1903032, 3GPP TSG RAN WG1 Meeting 96, Athens, Greece, dated Feb. 25-Mar. 1, 2019, 9 pages.
Intel Corporation, "CLI measurement and reporting at a UE," R1-1902489, 3GPP TSG RAN WG1 #96, Athens, Greece, dated Feb. 25-Mar. 1, 2019, 10 pages.
Qualcomm Incorporated, "Signal transmission and measurement for UE-to-UE CLI," R1-1903002, 3GPP TSG RAN WG1 Meeting #96, Athens, Greece, dated Feb. 25-Mar. 1, 2019, 8 pages.

* cited by examiner

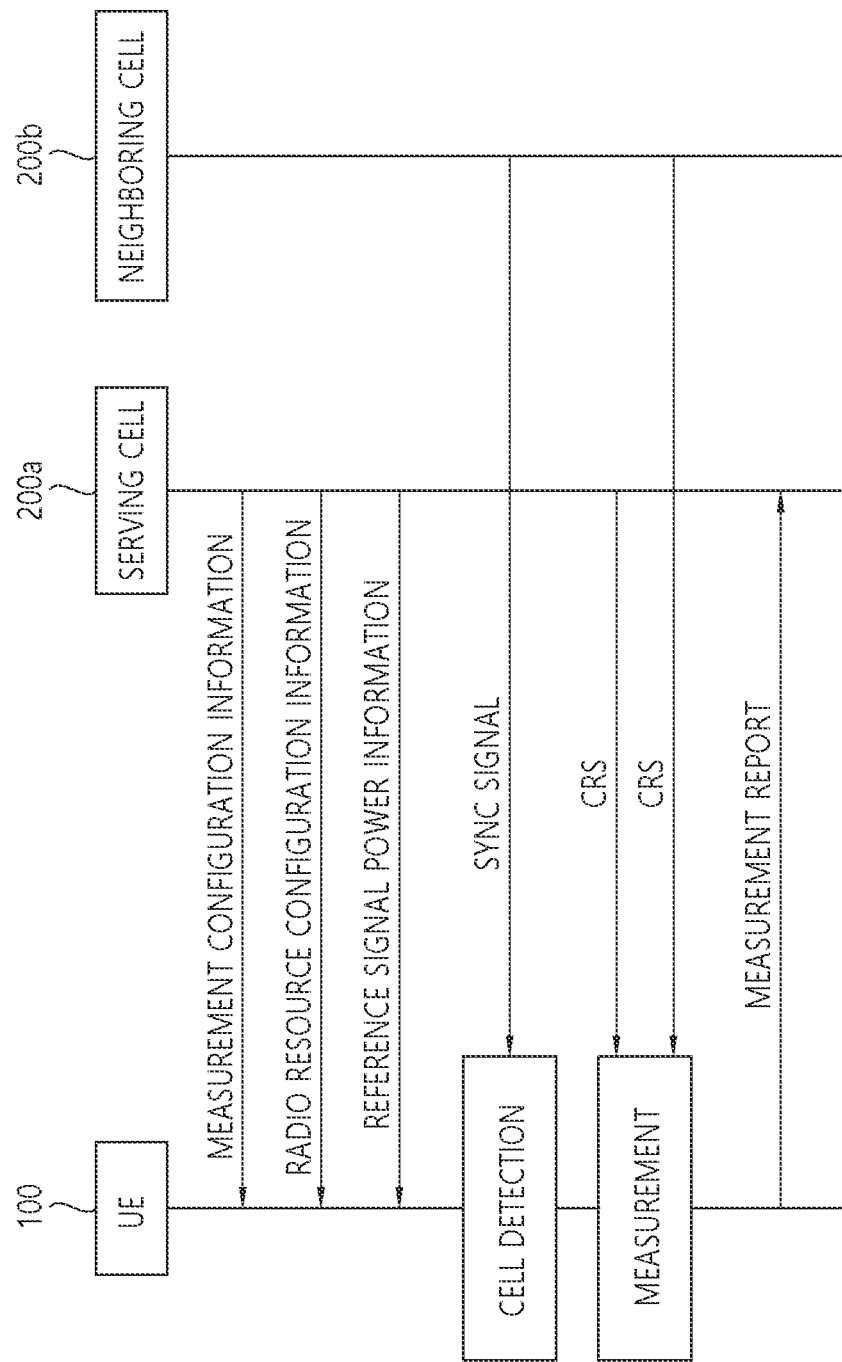

CROSS LINK INTERFERENCE MEASUREMENT

CROSS-REFERENCE TO RELATED APPLICATIONS

This application is a National Stage application under 35 U.S.C. § 371 of International Application No. PCT/KR2020/003680, filed on Mar. 18, 2020, which claims the benefit of Korean Patent Application No. 10-2019-0037284, filed on Mar. 29, 2019, and Korean Patent Application No. 10-2019-0037926, filed on Apr. 1, 2019. The disclosures of the prior applications are incorporated by reference in their entirety.

TECHNICAL FIELD

The present specification relates to mobile communication.

BACKGROUND

With the success in the Evolved Universal Terrestrial Radio Access Network (E-UTRAN) for 4th generation mobile communication, i.e., long term evolution (LTE)/LTE-Advanced (LTE-A), interest in the next-generation, i.e., 5th generation (also known as 5G) mobile communication is rising, and extensive research and development are in process.

A new radio access technology (New RAT or NR) is being researched for the 5th generation (also known as 5G) mobile communication.

5G mobile communication, defined by the International Telecommunication Union (ITU), refers to providing a data transmission rate of up to 20 Gbps and a perceived transmission speed of at least 100 Mbps anywhere. The official name is 'IMT-2020', and it aims to commercialize it worldwide in 2020.

In NR, the network may use flexible duplex scheduling which performs scheduling by adjusting the UL/DL ratio. If the DL/UL ratio is set differently according to the amount of traffic of each base station, interference between UEs or interference between base stations may occur due to the differently set UL/DL ratio between adjacent base stations. Depending on the strength of the interference between UEs or between base stations, each base station can determine whether to flexibly operate the UL/DL ratio.

For example, the base station may determine whether to flexibly operate the UL/DL based on the interference measurement of the UL/DL. Here, the UL/DL interference measurement may be, for example, cross link interference (CLI) measurement.

However, a method for effectively performing CLI measurement and signaling related to CLI measurement has not been discussed in the prior art.

SUMMARY

Accordingly, a disclosure of the specification has been made in an effort to solve the aforementioned problem.

In order to solve the above problems, one disclosure of the present specification provides a method for a first device to perform measurement. The method may comprise: transmitting capability information related to a reception of downlink signal transmitted from a serving cell and SRS(Sounding Reference Signal) transmitted from a second device to the serving cell; and performing CLI (Cross Link Interference) measurement based on the SRS from the second device.

In order to solve the above problems, one disclosure of the present specification provides a method for a base station to perform communication related to measurement. The method may comprise: receiving, from a first device, capability information related to reception of a downlink signal transmitted from the base station and a Sounding Reference Signal (SRS) transmitted from a second device; and receiving information related to Cross Link Interference (CLI) measured based on the SRS from the second device from the first device.

In order to solve the above problems, one disclosure of the present specification provides a first device for performing a measurement. The first device comprises: at least one processor; and at least one memory for storing instructions and operably electrically connectable with the at least one processor; wherein the operations performed based on the execution of the instructions by the at least one processor include: transmitting capability information related to a reception of downlink signal transmitted from a serving cell and SRS(Sounding Reference Signal) transmitted from a second device to the serving cell; and performing CLI (Cross Link Interference) measurement based on the SRS from the second device.

In order to solve the above problems, one disclosure of the present specification provides a base station for performing communication related to measurement. The base station may comprise: at least one processor; and at least one memory for storing instructions and operably electrically connectable with the at least one processor; wherein the operations performed based on the execution of the instructions by the at least one processor include: receiving, from a first device, capability information related to reception of a downlink signal transmitted from the base station and a Sounding Reference Signal (SRS) transmitted from a second device; and receiving information related to Cross Link Interference (CLI) measured based on the SRS from the second device from the first device.

In order to solve the above problems, one disclosure of the present specification provides an apparatus in mobile communication. The apparatus may comprise: at least one memory for storing instructions and operably electrically connectable with the at least one processor; wherein the operations performed based on the execution of the instructions by the at least one processor include: transmitting capability information related to a reception of downlink signal transmitted from a serving cell and SRS(Sounding Reference Signal) transmitted from a other apparatus to the serving cell; and performing CLI (Cross Link Interference) measurement based on the SRS from the other apparatus.

In order to solve the above problems, one disclosure of the present specification provides a non-volatile computer readable storage medium storing instructions. The instructions, based on executed by one or more processors, may cause the one or more processors to: generating capability information, which to be transmitted to a serving cell, related to a reception of downlink signal transmitted from a serving cell and SRS(Sounding Reference Signal) transmitted from a other apparatus to the serving cell; and performing CLI (Cross Link Interference) measurement based on the SRS from the other apparatus.

According to a disclosure of the present disclosure, the above problem of the related art is solved.

BRIEF DESCRIPTION OF THE DRAWINGS

FIG. 2 shows a procedure for cell detection and measurement.

DESCRIPTION OF EXEMPLARY EMBODIMENTS

Figure 1:
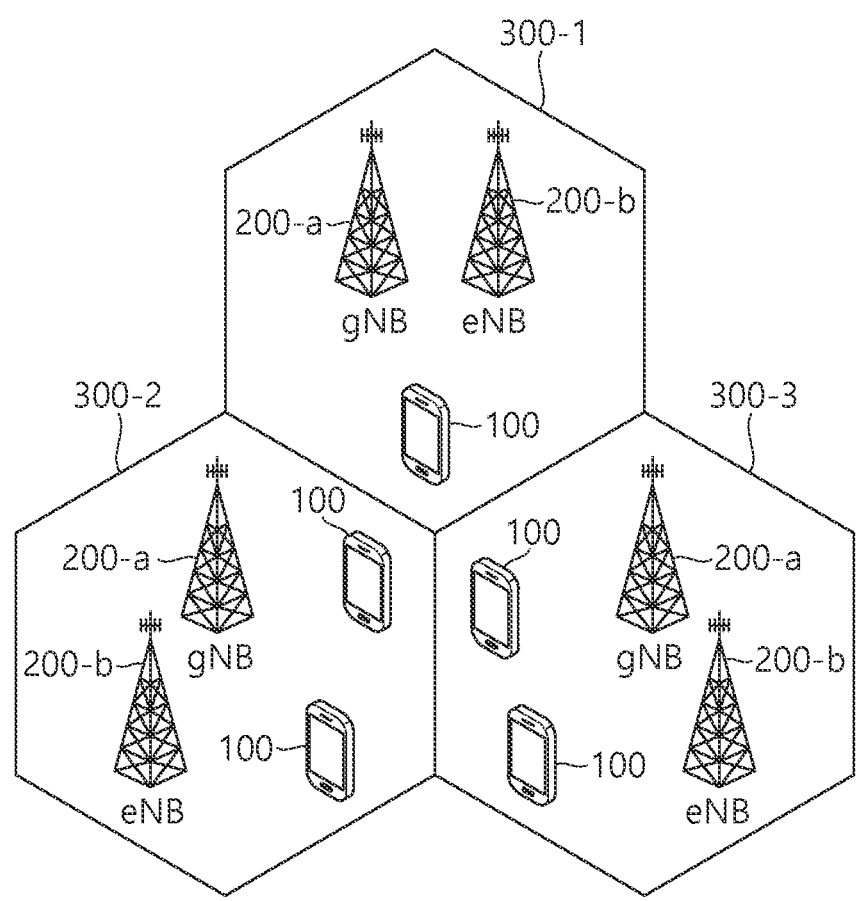
FIG. 1 illustrates an example of a wireless communication system.

The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner. The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present specification.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present specification will be described in greater detail with reference to the accompanying drawings. In describing the present specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

As used herein, "A or B" may mean "only A", "only B", or "both A and B". In other words, "A or B" herein may be understood as "A and/or B". For example, "A, B or C" herein means "only A", "only B", "only C", or any combination of A, B and C (any combination of A, B and C)".

As used herein, a slash (/) or a comma may mean "and/or". For example, "A/B" may mean "A and/or B". Accordingly, "A/B" may mean "only A", "only B", or "both A and B". For example, "A, B, C" may mean "A, B, or C".

As used herein, "at least one of A and B" may mean "only A", "only B", or "both A and B". In addition, the expression "at least one of A or B" or "at least one of A and/or B" may be understood as "At least one of A and B".

In addition, in this specification, "at least one of A, B and C" may mean "only A", "only B", "only C", or "any combination of A, B and C". In addition, "at least one of A, B or C" or "at least one of A, B and/or C" may mean "at least one of A, B and C".

In addition, the parentheses used herein may mean "for example". In detail, when "control information (PDCCH (Physical Downlink Control Channel))" is written herein, "PDCCH" may be proposed as an example of "control information". In other words, "control information" of the present specification is not limited to "PDCCH", and "PDDCH" may be proposed as an example of "control information". In addition, even when "control information (i.e. PDCCH)" is written, "PDCCH" may be proposed as an example of "control information".

The technical features individually described in one drawing in this specification may be implemented separately or at the same time.

In the accompanying drawings, user equipment (UE) is illustrated by way of example, but the illustrated UE may be referred to as a terminal, mobile equipment (ME), and the like. In addition, the UE may be a portable device such as a laptop computer, a mobile phone, a PDA, a smart phone, a multimedia device, or the like, or may be a non-portable device such as a PC or a vehicle-mounted device.

Hereinafter, the UE is used as an example of a device capable of wireless communication (eg, a wireless communication device, a wireless device, or a wireless device). The operation performed by the UE may be performed by any device capable of wireless communication. A device capable of wireless communication may also be referred to as a wireless communication device, a wireless device, or a wireless apparatus.

A base station, a term used below, generally refers to a fixed station that communicates with a wireless device, and may be called other terms such as an evolved-NodeB (eNodeB), an evolved-NodeB (eNB), a BTS (Base Transceiver System), an access point (Access Point), gNB (Next generation NodeB).

I. Techniques and Procedures Applicable to the Disclosure of the Present Specification FIG. 1 illustrates an example of a wireless communication system.

As seen with reference to FIG. 1, the wireless communication system includes at least one base station (BS) 200. Each BS 200 provides a communication service to specific geographical areas (generally, referred to as cells) 300*a*, 300*b*, and 300*c*. The cell can be further divided into a plurality of areas (sectors).

The UE 100 generally belongs to one cell and the cell to which the UE belong is referred to as a serving cell. ABS that provides the communication service to the serving cell is referred to as a serving BS. Since the wireless communication system is a cellular system, another cell that neighbors to the serving cell is present. Another cell which neighbors to the serving cell is referred to a neighbor cell. A BS that provides the communication service to the neighbor cell is referred to as a neighbor BS. The serving cell and the neighbor cell are relatively decided based on the UE.

Hereinafter, a downlink means communication from the BS 200 to the UE 100 and an uplink means communication from the UE 100 to the BS 200. In the downlink, a transmitter may be a part of the BS 200 and a receiver may be a part of the UE 100. In the uplink, the transmitter may be a part of the UE 100 and the receiver may be a part of the BS 200.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

<Measurement and Measurement Report>

Supporting mobility of a UE 100 is essential in a mobile communication system. Thus, the UE 100 constantly measures a quality of a serving cell which is currently providing a service, and a quality of a neighbor cell. The UE 10 reports a result of the measurement to a network at an appropriate time, and the network provides optimal mobility to the UE through a handover or the like. Measurement for this purpose is referred to as a Radio Resource Management (RRM).

Meanwhile, the UE 100 monitors a downlink quality of a primary cell (Pcell) based on a CRS. This is so called Radio Link Monitoring (RLM).

FIG. 2 shows a procedure for cell detection and measurement.

Referring to FIG. 2, a UE detects a neighbor cell based on Synchronization Signal (SS) which is transmitted from the neighbor cell. The SS may include a Primary Synchronization Signal (PSS) and a Secondary Synchronization Signal (SSS).

When the serving cell 200*a* and the neighbor cell respectively transmit Cell-specific Reference Signals (CRSs), the UE 100 measures the CRSs and transmits a result of the measurement to the serving cell 200*a*. In this case, the UE 100 may compare power of the received CRSs based on received information on a reference signal power.

At this point, the UE 100 may perform the measurement in the following three ways.

1) RSRP (reference signal received power): This represents an average reception power of all REs that carry the CRS which is transmitted through the whole bands. In this case, instead of the CRS, an average reception power of all REs that carry the CSI RS may also be measured.

2) RSS (received signal strength indicator): This represents a reception power which is measured through the whole bands. The RSSI includes all of signal, interference and thermal noise.

3) RSRQ (reference symbol received quality): This represents a CQI, and may be determined as the RSRP/RSSI according to a measured bandwidth or a sub-band. That is, the RSRQ signifies a signal-to-noise interference ratio (SINR). Since the RSRP is unable to provide a sufficient mobility, in handover or cell reselection procedure, the RSRQ may be used instead of the RSRP.

The RSRQ may be obtained by RSSI/RSSP.

Meanwhile, the UE 100 receives a radio resource configuration information element (IE) from the serving cell 100*a* for the measurement. The radio resource configuration information element (IE) is used to configure/modify/cancel a radio bearer or to modify an MAC configuration. The radio resource configuration IE includes subframe pattern information. The subframe pattern information is information on a measurement resource restriction pattern on the time domain, for measuring RSRP and RSRQ of a serving cell (e.g., PCell).

<Next-Generation Mobile Communication Network>

Thanks to the success of long term evolution (LTE)/LTE-advanced (LTE-A) for 4G mobile communication, interest in the next generation, i.e., 5-generation (so called 5G) mobile communication has been increased and researches have been continuously conducted.

The 5G mobile telecommunications defined by the International Telecommunication Union (ITU) refers to providing a data transmission rate of up to 20 Gbps and a feel transmission rate of at least 100 Mbps or more at any location. The official name is 'IMT-2020' and its goal is to be commercialized worldwide in 2300.

ITU proposes three usage scenarios, for example, enhanced Mobile Broad Band (eMBB) and massive machine type communication (mMTC) and ultra reliable and low latency communications (URLLC).

URLLC relates to usage scenarios that require high reliability and low latency. For example, services such as autonomous navigation, factory automation, augmented reality require high reliability and low latency (e.g., a delay time of 1 ms or less). Currently, the delay time of 4G (LTE) is statistically 21 to 43 ms (best 10%) and 33 to 75 ms (median). This is insufficient to support a service requiring a delay time of 1 ms or less. Next, an eMBB usage scenario relates to a usage scenario requiring a mobile ultra-wideband.

That is, the 5G mobile communication system aims at higher capacity than the current 4G LTE, may increase the density of mobile broadband users, and may support device to device (D2D), high stability and machine type communication (MTC). 5G research and development also aims at a lower latency time and lower battery consumption than a 4G mobile communication system to better implement the Internet of things. A new radio access technology (New RAT or NR) may be proposed for such 5G mobile communication.

Figure 3A:
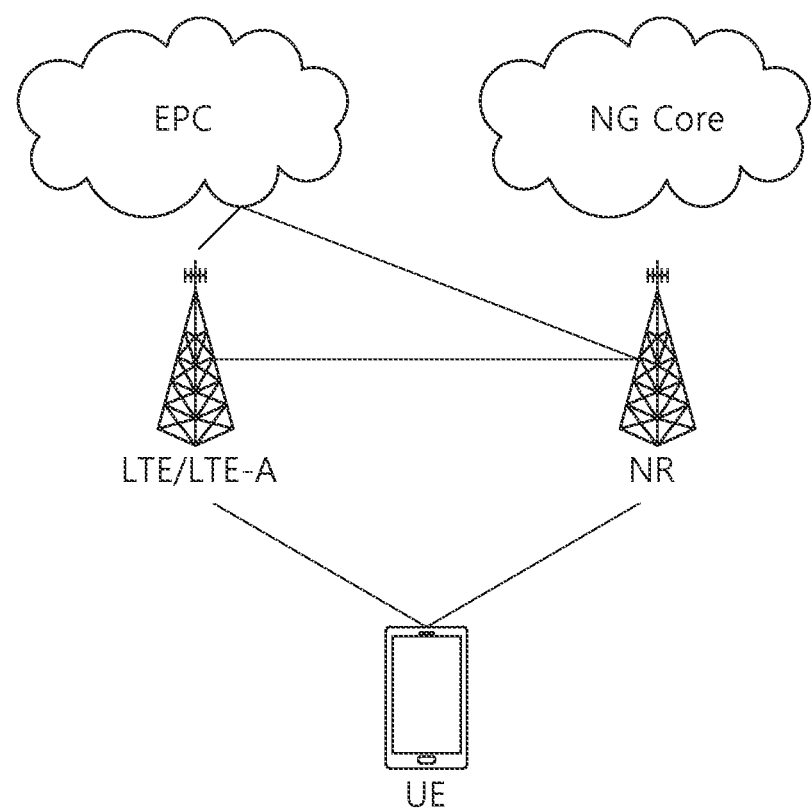
FIGS. 3a to 3c are exemplary diagrams illustrating exemplary architectures for services of the next generation mobile communication.
Figure 3B:
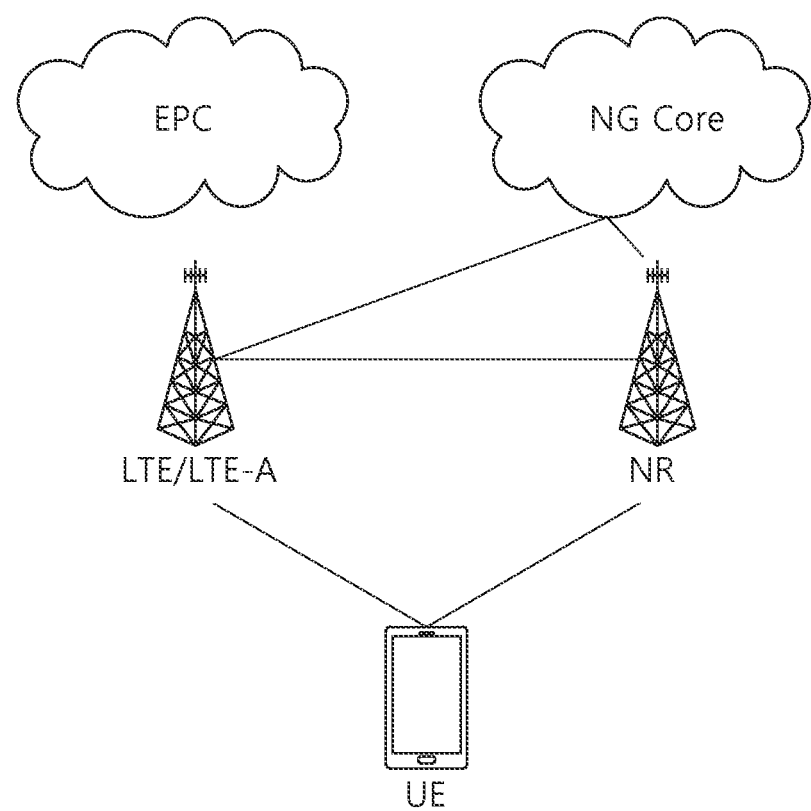
Figure 3C:
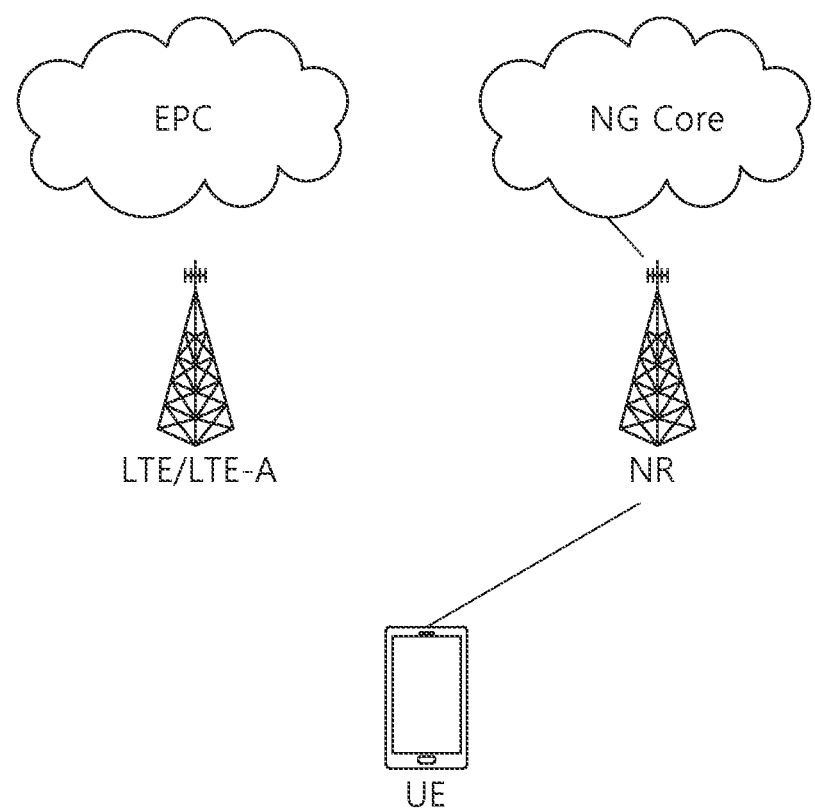

FIGS. 3a to 3c are exemplary diagrams illustrating exemplary architectures for services of the next generation mobile communication.

Referring to FIG. 3a, the UE is connected to LTE/LTE-A based cells and NR based cells in a dual connectivity (DC) manner.

The NR-based cell is connected to a core network for existing 4G mobile communication, that is, an evolved packet core (EPC).

Referring to FIG. 3b, unlike FIG. 3a, the LTE/LTE-A based cell is connected to a core network for the 5G mobile communication, that is, a next generation (NG) core network.

The service scheme based on the architecture as illustrated in FIGS. 3a and 3b is called non-standalone (NSA).

Referring to FIG. 3c, the UE is connected only to NR-based cells. The service method based on such an architecture is called standalone (SA).

On the other hand, in the NR, it may be considered that the reception from the base station uses a downlink subframe, and the transmission to the base station uses an uplink subframe. This method may be applied to paired spectra and unpaired spectra. A pair of spectra means that the two carrier spectra are included for downlink and uplink operations. For example, in a pair of spectra, one carrier may include a downlink band and an uplink band that are paired with each other.

Figure 4:
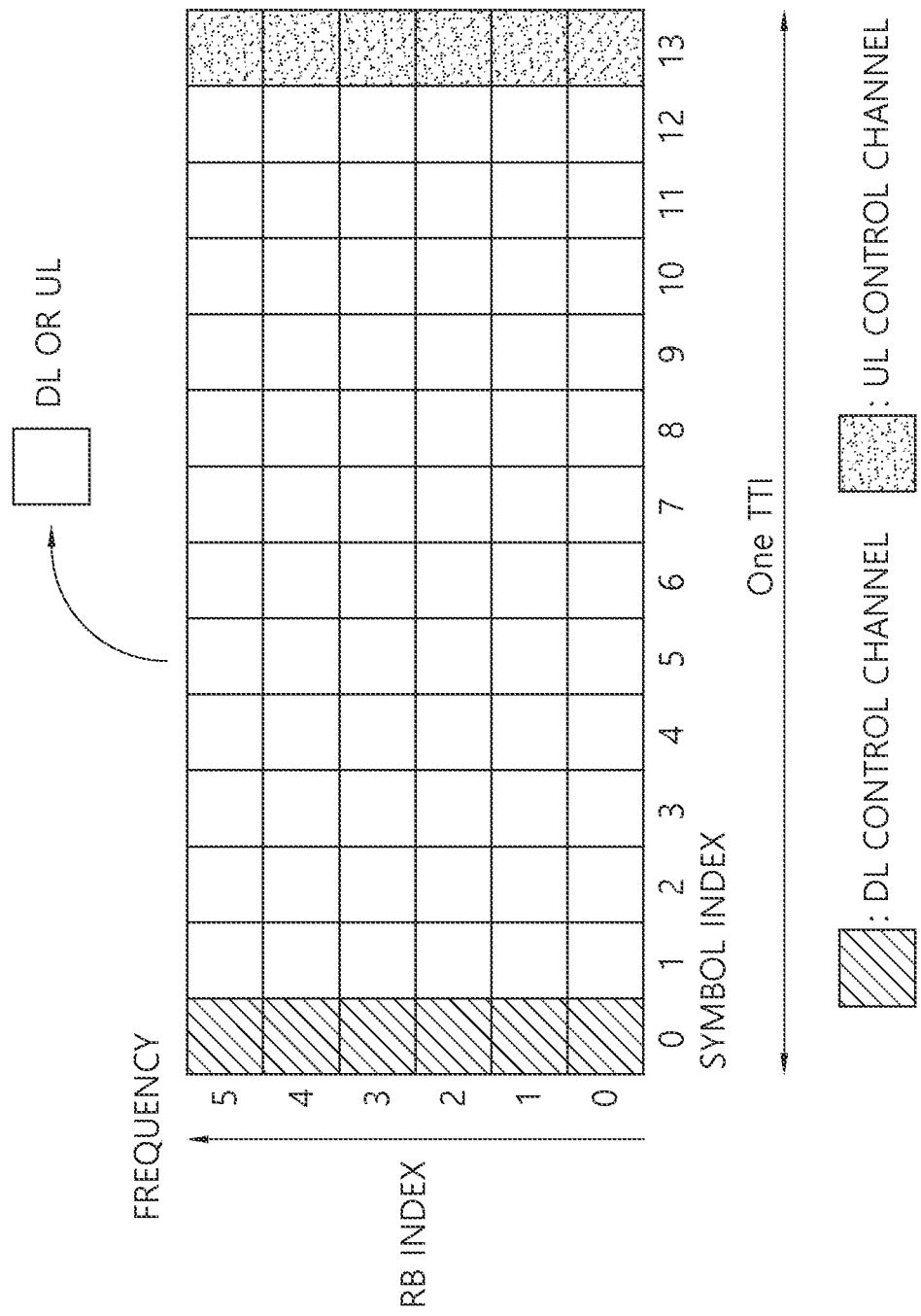
FIG. 4 shows an example of subframe type in NR.

FIG. 4 shows an example of subframe type in NR.

A transmission time interval (TTI) shown in FIG. 4 may be called a subframe or slot for NR (or new RAT). The subframe (or slot) in FIG. 4 may be used in a TDD system of NR (or new RAT) to minimize data transmission delay. As shown in FIG. 4, a subframe (or slot) includes 14 symbols as does the current subframe. A front symbol of the subframe (or slot) may be used for a downlink control channel, and a rear symbol of the subframe (or slot) may be used for a uplink control channel. Other channels may be used for downlink data transmission or uplink data transmission. According to such structure of a subframe (or slot), downlink transmission and uplink transmission may be performed sequentially in one subframe (or slot). Therefore, a downlink data may be received in the subframe (or slot), and a uplink acknowledge response (ACK/NACK) may be transmitted in the subframe (or slot). A subframe (or slot) in this structure may be called a self-constrained subframe. If this structure of a subframe (or slot) is used, it may reduce time required to retransmit data regarding which a reception error occurred, and thus, a final data transmission waiting time may be minimized. In such structure of the self-contained subframe (slot), a time gap may be required for transition from a transmission mode to a reception mode or vice versa. To this end, when downlink is transitioned to uplink in the subframe structure, some OFDM symbols may be set as a Guard Period (GP).

On the other hand, in the NR, it may be considered that the reception from the base station uses a downlink subframe, and the transmission to the base station uses an uplink subframe. This method may be applied to paired spectra and unpaired spectra. A pair of spectra means that the two carrier spectra are included for downlink and uplink operations. For example, in a pair of spectra, one carrier may include a downlink band and an uplink band that are paired with each other.

The NR supports a plurality of numerologies (e.g. a plurality of values of subcarrier spacing (SCS)) in order to support various 5G services. For example, when the SCS is 15 kHz, a wide area in traditional cellular bands is supported. When the SCS is 30 kHz/60 kHz, a dense-urban, lower-latency, and wider carrier bandwidth is supported. When the SCS is 60 kHz or greater, a bandwidth greater than 24.25 GHz is supported in order to overcome phase noise.

An NR frequency band may be defined as two types (FR1 and FR2) of frequency ranges. The frequency ranges may be changed. For example, the two types (FR1 and FR2) of frequency bands are illustrated in Table 1. For the convenience of description, among the frequency bands used in the NR system, FR1 may refer to a "sub-6-GHz range", FR2 may refer to an "above-6-GHz range" and may be referred to as a millimeter wave (mmWave).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As described above, the frequency ranges for the NR system may be changed. For example, FR1 may include a range from 410 MHz to 7125 MHz as illustrated in Table 3. That is, FR1 may include a frequency band of 6 GHz or greater (or 5850, 5900, 5925 MHz, or the like). For example, the frequency band of 6 GHz or greater (or 5850, 5900, 5925 MHz or the like) included in FR1 may include an unlicensed band. The unlicensed band may be used for various uses, for example, for vehicular communication (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 5:
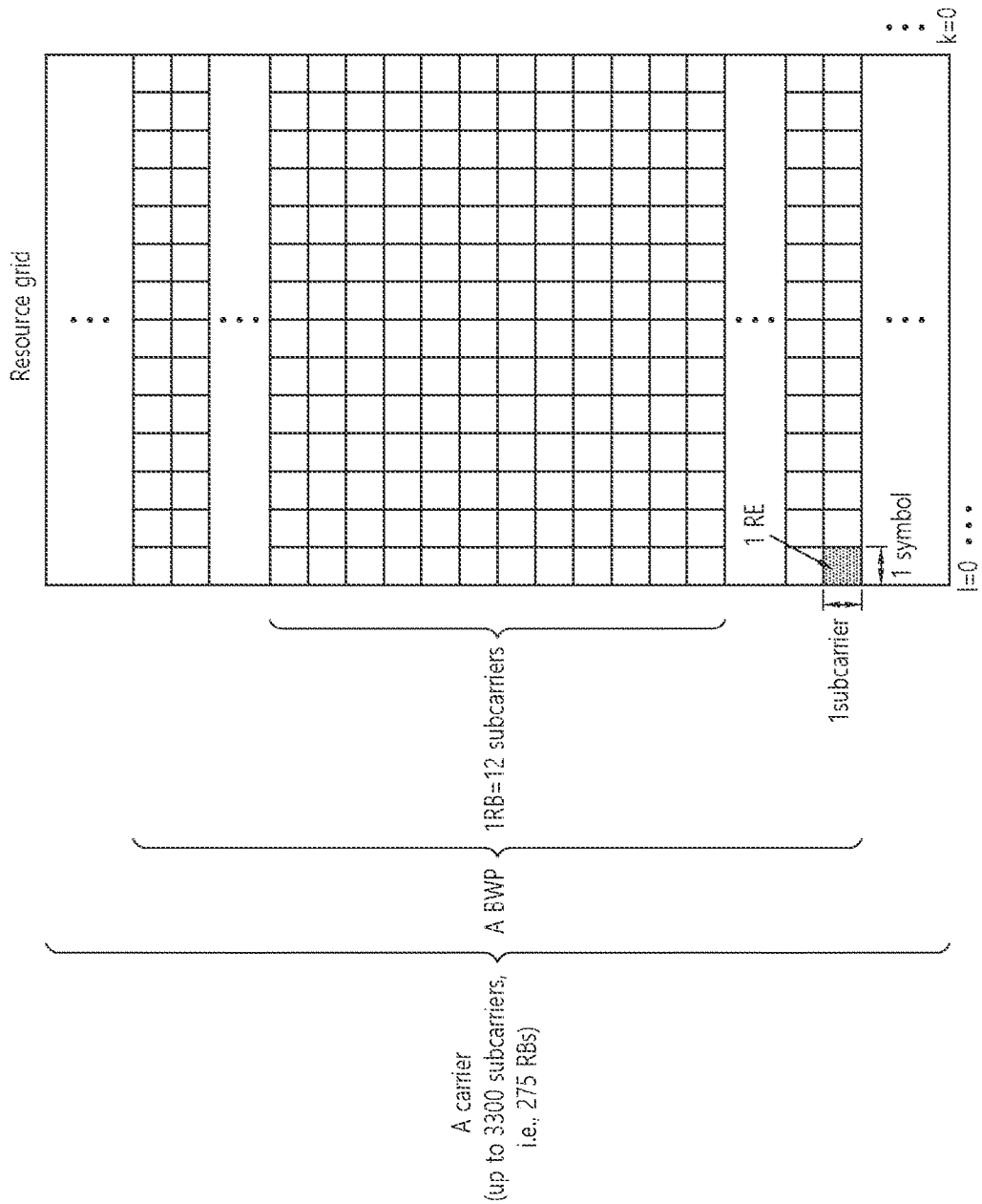
FIG. 5 illustrates the slot structure of an NR frame.

FIG. 5 illustrates the slot structure of an NR frame. The structure shown in FIG. 5 is an example of a slot structure of an NR frame. A slot includes a plurality of symbols in the time domain. For example, in the case of a normal CP, one slot includes 7 symbols, but in the case of an extended CP, one slot includes 6 symbols. The carrier includes a plurality of subcarriers in the frequency domain. A resource block (RB) is defined as a plurality of (eg, 12) consecutive subcarriers in the frequency domain. A bandwidth part (BWP) is defined as a plurality of consecutive (P)RBs in the frequency domain, and may correspond to one numerology (eg, SCS, CP length, etc.). A carrier may include a maximum of N (eg, 5) BWPs. Data communication is performed through the activated BWP, and only one BWP can be activated for one terminal. Each element in the resource grid is referred to as a resource element (RE), and one complex symbol may be mapped.

<Bandwidth Part: BWP>

A wideband frequency maximally reaching 400 MHz may be used in NR. A new concept of BWP was introduced in NR to enable various UEs to efficiently distribute and use a frequency band.

When UEs transmit the information about their abilities to a base station while performing initial access, the base station may configure a BWP to be used by the UEs to the UEs and may transmit the information about the configured BWP to the UE. Accordingly, downlink and uplink data transmission and reception between the UEs and the base station are performed only through the BWP configured in the UEs. That is, configuring the BWP in the UEs by the base station is to instruct the UEs not to use frequency bands other than the BWP when performing wireless communication with the base station later.

The base station may configure the entire band of the carrier frequency reaching 400 MHz as the BWP for the UEs or may configure only some bands as the BWP for the UEs. Further, the base station may configure several BWPs for one UE. When several BWPs are configured for one UE, the frequency bands of the BWPs may overlap each other or not.

<Quasi Co-Located: QCL)>

"Quasi Co-Located" means the following. For example, between two antenna ports, if a large-scale characteristic of a radio channel through which one symbol is transmitted through one antenna port can be inferred from a radio channel through which one symbol is transmitted through another antenna port, it can be expressed that the two antenna ports are Quasi Co-Located.

Here, the large-scale characteristic includes one or more of delay spread, Doppler spread, frequency shift, average received power, and received timing. Hereinafter, Quasi Co-Located will be referred to simply as QCL.

That is, when two antenna ports are QCLed, it means that the large-scale characteristics of the radio channel from one antenna port are the same as the large-scale characteristics of the radio channel from the other antenna port. Considering a plurality of antenna ports through which a reference signal (RS) is transmitted, when the antenna ports through which two different types of RS are transmitted are QCLed, a large-scale characteristic of a radio channel from one type of antenna port may be replaced with a large-scale characteristic of a radio channel from another type of antenna port.

According to the concept of QCL, for non-QCL antenna ports, the UE cannot assume the same broadband characteristic between radio channels from corresponding antenna ports. That is, in this case, the UE must perform independent processing for each configured non-QCL antenna port with respect to timing acquisition and tracking, frequency offset estimation and compensation, delay estimation and Doppler estimation, and the like.

For antenna ports that may be assumed as QCLed, the UE may perform the following operations:

For delay spread and Doppler spread, the UE equally applies the power-delay-profile, delay spread, and Doppler spread estimation results for a radio channel from one antenna port to the Wiener filter and the like, which are used for estimating a channel for a radio channel from another antenna.

With respect to frequency shift and received timing, the UE may perform tracking time and frequency synchronization for one antenna port, and then apply the same synchronization to demodulation of another antenna port.

For average received power, the UE may average RSRP (Reference Signal Received Power) measurements for two or more antenna ports.

In 5G NR, the UE may be configured up to M TCI (Transmission Configuration Indicator)-States (TCI-States) to decode the Physical Downlink Shared Channel (PDSCH) by higher layer signaling according to the detected PDCCH along with the DCI for the UE and the serving cell. Herein, M differes depends on the UE capability. Each configured TCI state may include one RS set TCI-RS-SetConfig. Each TCI-RS-SetConfig includes parameters for setting the QCL relationship between the RS in the RS set and the DM-RS port group of the PDSCH.

The RS set includes a reference for one or two DL RSs and a higher layer parameter QCL-Type for the associated QCL-Type for each DL RS. Regardless of whether the reference is to the same DL RS or to a different DL RS, for two DL RSs, the QCL type must not be the same.

The QCL types are known to the UE by the higher layer parameter QCL-Type, and the QCL type may be one or a combination of the following types:

QCL-TypeA: {Doppler shift, Doppler spread, mean delay, Delay spread}
QCL-TypeB: {Doppler shift, Doppler spread}
QCL-TypeC: {Doppler shift, mean delay}
QCL-TypeD: {spatial Rx parameter}

<SRS (Sounding Reference Signal)>

SRS is an uplink reference signal. That is, the SRS is a reference signal transmitted by the UE to the base station. The base station may estimate the channel quality based on the SRS received from the UE. For example, the base station may acquire information on multipath fading, scattering, Doppler, power loss of a transmission signal, etc. based on the SRS.

The base station may estimate the channel quality by using the SRS, and manage resource scheduling, beam management, and signal power control. The base station may acquire channel information for the entire bandwidth based on the SRS, and the base station may determine resource allocation having better channel quality compared to other bandwidth regions based on the channel information. In other words, the base station may allocate a specific frequency region suitable for the UE based on the SRS transmitted by the UE.

<CLI (Cross Link Interference) Measurement>

UE capable of performing CLI measurement may perform SRS-RSRP and CLI-RSSI within the active DL BWP.

The SRS-RSRP may be defined as a linear average of the power contribution (unit [W]) of resource elements carrying SRS. SRS-RSRP may be measured through configured resource elements within the considered measurement frequency bandwidth considered in the configured measurement time occasions.

For FR 1, the reference point of SRS-RSRP may be the antenna connector of the UE. For FR2, SRS-RSRP may be measured based on a combined signal from antenna elements corresponding to a given receiver branch. For FR 1 and FR 2, if receiver diversity is used by the UE, the reported SRS-RSRP value may not be lower than the corresponding SRS-RSRP of any individual receiver branch.

The UE may periodically perform SRS-RSRP measurement on a resource configured based on SRS-RSRP configuration information (eg, srs-ResourceConfigCLI) provided from the serving cell. The UE may periodically report the measured SRS-RSRP to the serving cell.

CLI-RSSI is CLI Received Signal Strength Indicator. CLI-RSSI may be defined as a linear average of the total received power measured from all sources (including co-channel serving cells, non-serving cells, adjacent channel interference, thermal noise, etc.) configured in the configured OFDM symbol of the configured time resource in the configured measurement bandwidth.

For FR 1, the reference point of CLI-RSSI may be the antenna connector of the UE. For FR2, CLI-RSSI may be measured based on a combined signal from antenna elements corresponding to a given receiver branch. For FR 1 and FR 2, if receiver diversity is used by the UE, the reported CLI-RSSI value may not be lower than the corresponding CLI-RSSI of any individual receiver branch.

The UE may periodically measure CLI-RSSI for a resource configured based on configuration information (eg, rssi-ResourceConfigCLI) regarding CLI-RSSI provided from the serving cell. The subcarrier spacing for the configuration related to CLI-RSSI measurement may be the same as or different from the subcarrier spacing of the active BWP of the UE. The UE may periodically report the measured CLI-RSSI to the serving cell.

II. Disclosure of the Present Specification

The disclosures described below in this specification may be implemented in one or more combinations. Each of the drawings shows an embodiment of each disclosure, but the embodiments of the drawings may be implemented in combination with each other.

In the 5G NR network, TDD and FDD may be used for the sub 6 GHz band, and TDD may be used for the above 6 GHz band.

When TDD is used, the base station configures the DL/UL configuration for communication between the terminal and the base station, so that the ratio of the DL to the UL can be set differently according to the amount of traffic (eg, the amount of DL traffic and the amount of UL traffic).

On the other hand, the same DL/UL configuration must be used to avoid the influence of interference between adjacent cells or other operators using the same frequency band or adjacent frequency band, so that flexibility of the DL/UL configuration may be limited. For example, when cell A and cell B are adjacent to each other and cell A and cell B use the same frequency band or adjacent frequency band, cell A and cell B may have to use the same DL/UL configuration.

As another example, when cell A of operator A and cell B of operator B are adjacent to each other and cell A and cell B use the same frequency band or adjacent frequency band, cell A and cell B may have to use the same DL/UL configuration.

When FDD is used, since a frequency used for DL and a frequency used for UL are determined regardless of the amount of DL/UL traffic, the base station cannot change the DL/UL ratio.

In order to increase system capacity by using this DL/UL ratio more efficiently according to the amount of traffic (eg, DL traffic and/or UL traffic) of the cell, a method of applying flexible duplex may be considered. Here, flexible duplex means that each cell performs scheduling by adjusting the DL/UL ratio based on the amount of DL traffic and/or UL traffic.

Figure 6:
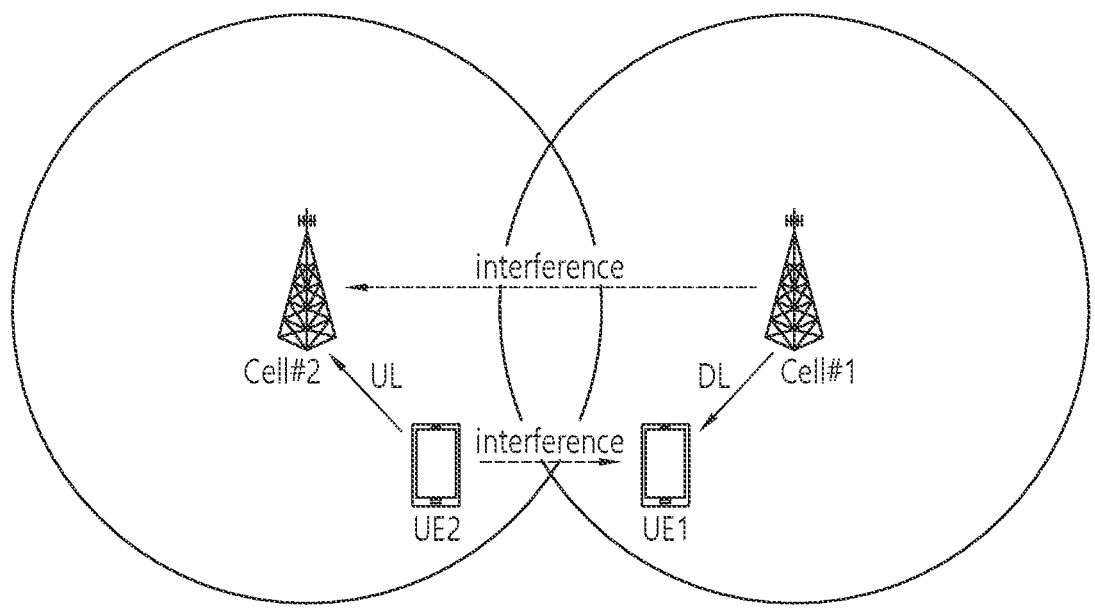
FIG. 6 shows an example to which a flexible duplex is applied.

FIG. 6 shows an example to which a flexible duplex is applied.

Referring to FIG. 6, Cell #1 may be a first base station, and a serving cell of UE #1 may be Cell #1. Cell #2 may be the second base station, and the serving cell of UE #2 may be the second base station. Cell #1 and Cell #2 may be adjacent cells. For example, the neighboring cell of Cell #1 may be Cell #2.

Cell #1 and Cell #2 may perform communication using the same frequency band or an adjacent frequency band.

Cell #1 and Cell #2 may adjust the DL/UL ratio by applying flexible duplex, and may communicate with UE #1 and UE #2, respectively, based on the adjusted DL/UL ratio. If the DL/UL ratio of Cell #1 and the DL/UL ratio of Cell #2 are set differently according to the amount of traffic in each cell, interference between UEs or interference between base stations may occur due to differently set UL/DL ratios between neighboring cells.

For example, as in the example shown in FIG. 6, when UE #2 performs UL data transmission, UE #1 may perform DL data reception. Since UE #1 and UE #2 communicate using the same frequency band or adjacent frequency band, the UL signal transmitted by UE #2 may affect the DL signal that UE #1 will receive from Cell #1. have. That is, when UE #1 receives the DL signal from Cell #1, interference by the UL signal of UE #2 may occur. In addition, the DL signal transmitted by Cell #1 may affect the UL signal that Cell #2 will receive from UE #2. That is, when Cell #2 receives the UL signal from UE #2, interference by the DL signal of Cell #1 may occur.

As described above, when the DL/UL ratio is set differently according to the amount of traffic in each cell, interference between UEs or between base stations may occur due to UL/DL between adjacent cells. Accordingly, the base station of each cell can determine whether to flexibly operate the UL/DL ratio according to the strength of the interference between UEs or interference between the base stations. For example, the base station of each cell may determine whether to flexibly operate the UL/DL based on the UL/DL interference measurement. Here, the UL/DL interference measurement may be, for example, cross link interference (CLI) measurement. Herein, the CLI measurement may mean measurement performed by a UE (eg, UE #1 in FIG. 6) that measures interference due to a signal transmitted from a UE (eg, UE #2 in FIG. 6) of an interfering cell (eg, Cell #2 in FIG. 6).

Hereinafter, operations of a base station and a terminal (eg, UE) for effectively performing CLI measurement and signaling related to CLI measurement will be described. As an example, below, operations of a base station and a terminal for reducing power consumption of a terminal when measuring CLI in a network supporting flexible duplex may be described. As another example, below, operations of a base station and a terminal for reducing overhead of a reference resource related to CLI may be described. As another example, below, when the UE performs CLI measurement based on SRS, an SRS-related configuration for reducing the implementation complexity of the reception performance of the UE may be described.

Several methods (eg, methods described in the first example, the second example, and the third example) of the disclosure of the present specification described below may be implemented in combination of one or more.

1. First Example of the Disclosure of the Present Specification

Hereinafter, the capability of the terminal related to the measurement of interference of the neighbor cell and/or the reference signal transmitted by a terminal of the neighbor cell and the reception condition of the terminal will be described. For example, in order to measure interference of an neighbor cell and/or a reference signal transmitted by terminal of the neighbor cell, the capability (capability) of the terminal and the reception condition of the terminal will be described.

In order to flexibly use the UL/DL of a frequency resource, a method for mitigating interference caused by different UL/DL settings of adjacent cells may be required. An example of a method for this may be an operation method of a base station through Cross Link Interference (CLI) measurement. Here, in the CLI measurement may mean a measurement performed by a UE (eg, UE #1 in FIG. 6) that measures interference due to a signal transmitted from a UE (eg, UE #2 in FIG. 6) of an interfering cell (eg, Cell #2 in FIG. 6).

As an example of the operation method of the base station through CLI measurement, based on the interference level of the interfering cell reported by the UE, the serving cell may stop using flexible duplex and matches the UL/DL configuration with the neighboring cell (ie, the interfering cell) or control interference through power control, etc.

For example, when the base station uses flexible duplex for each cell, the UE may measure the interference caused by the UE in the interfering cell and report it to the base station. When the reported interference level is large (eg, when the interference level is higher than the threshold), the base station stops using flexible duplex and may adjust the interference by matching the UL/DL configuration with the neighboring cell. Alternatively, the base station may adjust the interference by reducing the transmission power of the UL signal of the UE of the neighboring cell by using the power control or may adjust the interference by increasing the transmission power of the DL signal to be transmitted by the base station to the UE. In this case, the base station may transmit information requesting power reduction to the neighbor cell in order to reduce the transmission power of the UL signal of the UE of the neighbor cell.

Figure 7:
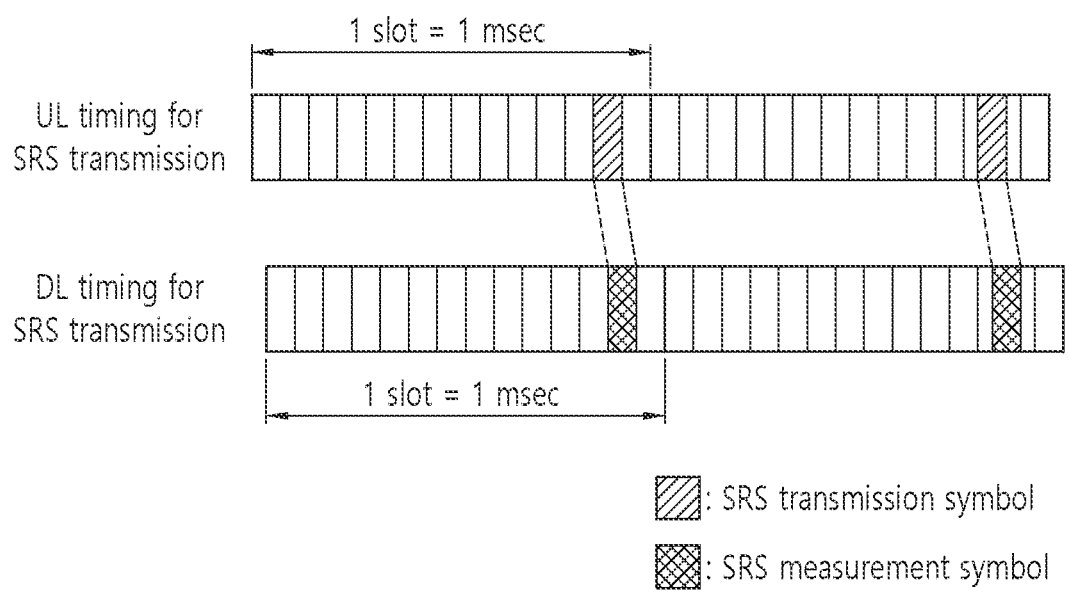
FIG. 7 shows an example of UL timing for SRS transmission and DL timing for SRS reception.

In order for the UE (eg, UE #1 of FIG. 6) to measure the CLI, as in the example of FIG. 7, the UE may monitor a sounding reference signal (SRS) transmitted by a UE of a neighboring cell (eg, UE #2 of FIG. 6) at regular cycle and reports the measured value (eg, SRS-RSRP) to the base station (eg, Cell #1 of FIG. 6). Here, SRS-RSRP may mean RSRP measured by the UE based on SRS.

FIG. 7 shows an example of UL timing for SRS transmission and DL timing for SRS reception.

Referring to FIG. 7, an example of the UL timing for the UE (eg, UE #2 in FIG. 6) of the neighboring cell to transmit SRS and An example of DL timing for the UE (eg, UE #1 in FIG. 6) to receive the SRS to perform CLI measurement. The example shown in FIG. 7 is an example of UL timing and DL timing for SRS reception when SCS is 15 kHz. When the SCS is 15 kHz, as shown in FIG. 7, the length of one slot is 1 msec. As another example, when the SCS is 30 kHz, the length of one slot may be 0.5 msec, and when the SCS is 60 kHz, the length of one slot may be 0.25 msec.

The SRS transmission symbol may be a symbol scheduled for SRS transmission by a UE of a neighboring cell (eg, UE #2 in FIG. 6). The SRS measurement symbol may be a symbol scheduled for the UE (eg, UE #1 of FIG. 6) to measure the SRS of the UE (eg, UE #2 of FIG. 6) of a neighboring cell.

When the UE of the neighboring cell (eg, UE #2 in FIG. 6) transmits SRS, as in the example shown in FIG. 7, the UE of the neighboring cell (eg, UE #2 in FIG. 6) may transmit SRS by applying UL timing advance (TA) to the DL timing of the UE of the neighboring cell (eg, UE #2 in FIG. 6).

Therefore, even if the DL timing of the UE (eg, UE #2 in FIG. 6) of the neighboring cell coincides with the DL timing of the UE (eg, UE #1 in FIG. 6), due to the UL TA of the UE of the neighboring cell (eg, UE #2 in FIG. 6), situation that he UL timing for SRS transmission of the UE (eg, UE #2 in FIG. 6) of the neighboring cell and the DL timing for SRS reception by the UE (eg, UE #1 in FIG. 6) do not coincide.

Due to this, the UE (eg, UE #1 in FIG. 6) may not be able to accurately perform measurement based on the SRS transmitted by the UE (eg, UE #2 in FIG. 6) of a neighboring cell. Therefore, in this case, an operation of a UE or a scheduling operation in a base station for effectively and/or accurately performing an SRS-based measurement may be required.

As shown in the example of FIG. 7, the UE transmitting the SRS (eg, UE #2 in FIG. 6) may transmit the SRS by applying uplink TA. Therefore, in order for the UE receiving the SRS (eg, UE #1 in FIG. 6) to measure the SRS, the receiving UE (eg, UE #1 in FIG. 6) should must receive SRS before a configured SRS measurement symbol (SRS measurement symbol in FIG. 7) timing. That is, it may be necessary to shift the SRS DL timing of the UE (eg, UE #1 in FIG. 6) by a predetermined time.

When the base station transmits a downlink signal (eg, PDSCH/PDCCH, etc.) up to the symbol before the SRS measurement symbol of the UE (eg, UE #1 in FIG. 6), the symbol for measuring SRS (eg, A symbol that transmitted from UE #2 in FIG. 6 and that UE #1 receives and for performing CLI measurement based on SRS) and a symbol in which the PDSCH/PDCCH is received may collide. For example, since the UE of the neighboring cell (eg, UE #2 in FIG. 6) transmits SRS by applying uplink TA, the SRS measurement symbol of the UE (eg, UE #1 in FIG. 6) and symbols on which the PDSCH/PDCCH are received may be overlapped.

When the SRS measurement symbol and the symbol in which the PDSCH/PDCCH is received collide, the following two operations may be considered for the base station and the terminal. For reference, only one of the following two operations may be performed, or both operations may be performed.

Operation 1) The UE may set different DL timings for symbols in which a downlink signal (eg, PDSCH/PDCCH) and SRS collide (that is, overlapping PDSCH/PDCCH reception symbols and SRS measurement symbols), and decode the two signals by applying dual FFT (Fast Fourier Transform). Specifically, the UE applies dual FFT to independently set the signal reception timing (FFT boundary) (ie, DL timing) for the downlink signal (eg, PDSCH/PDCCH) and the SRS, thereby may receive the downlink signal and the SRS at the same time. In other words, the UE may simultaneously perform SRS reception and downlink signal reception (eg, PDSCH/PDCCH). In this case, the complexity of the terminal may increase. Whether the UE can simultaneously perform SRS reception and downlink signal reception (eg, PDSCH/PDCCH) may be classified by capability information.

Operation 2) For a symbol in which a downlink signal (eg, PDSCH/PDCCH) and SRS collide (ie, a PDSCH/PDCCH reception symbol and an SRS measurement symbol that overlap each other), the UE may not perform reception of a downlink signal (eg, PDSCH/PDCCH), and receive/measure the SRS and report it to the base station. For example, the UE may not perform an operation of receiving a downlink signal (eg, PDSCH/PDCCH) with respect to the SRS measurement symbol and N (eg, 1 or 2) symbols before the SRS measurement symbol, and the UE may receive SRS. And, the UE may perform CLI measurement (eg, SRS-RSRP measurement) based on the received SRS, and report the measurement result to the base station. In this case, when the base station schedules the downlink signal for the terminal, the base station may consider rejection of reception of the downlink signal (eg, PDSCH/PDCCH).

When the above-described operation 1) is applied to the terminal and the base station, capability (eg, dual FFT reception capability) related to reception of SRS and reception of downlink signals (eg, PDSCH/PDCCH) may need to be defined. The terminal may report the corresponding capability to the base station.

For example, the capability related to SRS reception and downlink signal reception may be dual FFT reception capability, and the capability related to SRS reception and downlink signal reception may mean the capability of the UE to perform reception of SRS and downlink signals (eg: PDSCH/PDCCH) simultaneously.

The terminal may report dual FFT reception capability information to the base station. That is, signaling for capability information related to reception of SRS and reception of downlink signals may be defined.

For example, the capability information may be simultaneousRxDataSRS. simultaneousRxDataSRS may be information on whether the UE can simultaneously receive a downlink signal and an SRS. For example, simultaneousRxDataSRS may be information on whether the UE can simultaneously receive a downlink signal (eg, PDSCH/PDCCH) transmitted from the serving cell and the SRS by Frequency Division Multiplexing-ed (FDMed) reception. simultaneousRxDataSRS-DiffDLtiming in Table 3 below is an example of capability information transmitted by the UE.

TABLE 3 simultaneousRxDataSRS-DiffDLtiming ENUMERATED {supported} OPTIONAL simultaneousRxDataSRS-DiffDLtiming is an example of capability information (ie, capability information related to SRS reception and downlink signal reception) transmitted by the UE. For reference, the name of the capability information transmitted by the UE is not limited to "simultaneousRxDataSRS-DiffDLtiming", and the name of the capability information may include any name related to SRS reception and downlink signal reception. The capability information may include capability information related to reception of a downlink signal and reception of an SRS signal of the terminal. For reference, the capability information may be transmitted by being included in PhyParameters among physical layer parameters transmitted by the UE to the base station.

When the UE performs communication based on the FR2 frequency band, when the UE receives the PDSCH/PDCCH and the SRS by using the Rx beam (reception beam), the UE may assume that the PDSCH/PDCCH and the SRS are QCL-Type D. should be able This is because the interference recognized by the UE must be measured in an environment in which the downlink signal transmitted by the serving cell is received (ie, the environment in which the reception beam of the UE is in the direction of the serving cell). Accordingly, in order for the UE to simultaneously receive the PDSCH/PDCCH and the SRS, the UE must be able to receive the SRS with the reception beam directed toward the serving cell. Accordingly, if the UE assumes that the PDSCH/PDCCH and the SRS are QCL-Type D, the UE may simultaneously receive the PDSCH/PDCCH and the SRS while directing the reception beam toward the serving cell.

In the case of operation 2), since the terminal does not perform reception of a downlink signal for a symbol in which a downlink signal (eg, PDSCH/PDCCH) and SRS collide, at least N number of symbol (for example, 1 symbol) before SRS measurement symbols and SRS measurement symbols, the base station may not transmit a downlink signal (eg, PDSCH/PDCCH). To this end, the base station may set scheduling restrictions for N (eg: 1) symbols before the SRS measurement symbol. For example, the base station may not schedule the PDSCH/PDCCH transmission for the SRS measurement symbol and one symbol before the SRS measurement symbol.

The UE may not expect to receive the PDSCH/PDCCH on an OFDM symbol on which the UE performs CLI measurement (eg, an SRS measurement symbol) and one data symbol before the OFDM symbol.

Here, the OFDM symbol for performing CLI measurement may also be referred to as, for example, a CLI-measurement (SRS) measured OFDM symbol. In addition, based on the capability of the UE, the UE may not expect to receive the PDSCH/PDCCH on an OFDM symbol (eg, an SRS measurement symbol) for performing CLI measurement and one data symbol before the corresponding OFDM symbol.

For example, if the UE does not support the capability (eg simultaneousRxDataSRS-DiffDLtiming) associated with the reception of SRS and reception of downlink signals, the UE may not be expected to receive the PDSCH/PDCCH on the OFDM symbol on which the UE performs CLI measurement (eg, SRS measurement symbol) and on one data symbol before the corresponding symbol.

Figure 8:
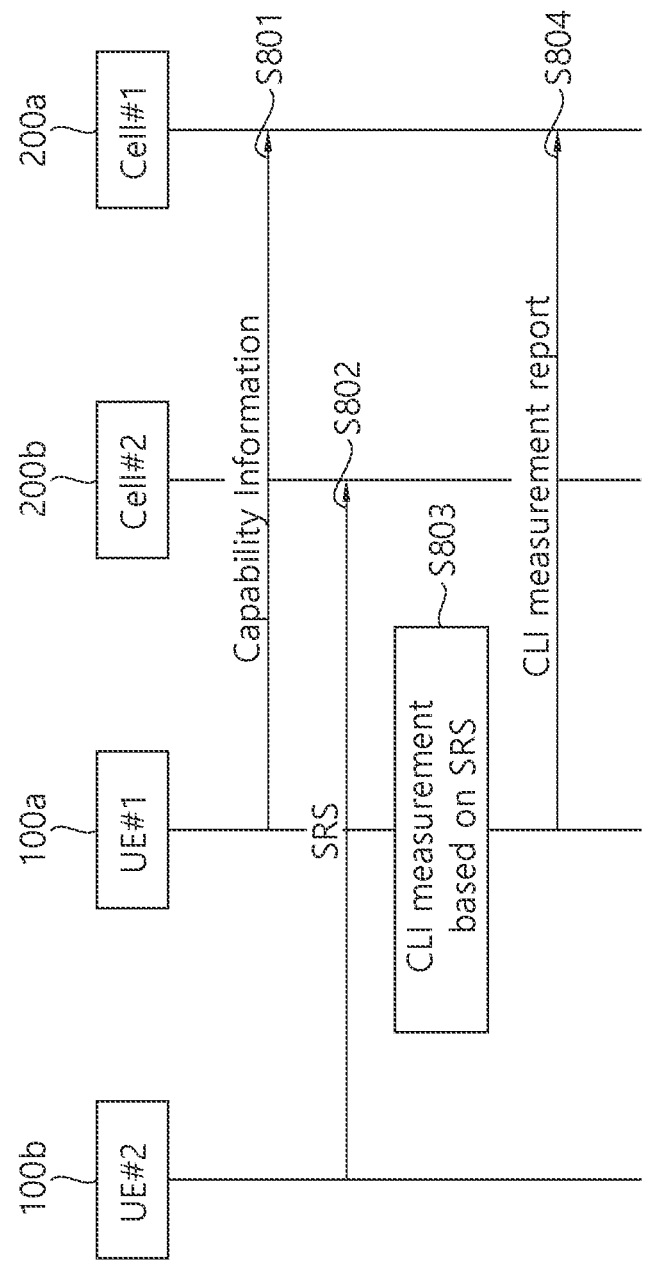
FIG. 8 shows a signal flow diagram based on a first example of the disclosure of the present specification.

FIG. 8 shows a signal flow diagram based on a first example of the disclosure of the present specification.

UE #1 100a may be UE #1 100a of FIG. 6. UE #2 100b may be UE #2 100b of FIG. 6. Cell #1 200a may be Cell #1 200a of FIG. 6. Cell #2 200b may be Cell #2 200b of FIG. 6. Hereinafter, reference numerals of UE #1100a, UE #2100b, Cell #1200a, and Cell #1200a will be omitted and described.

In step S801, UE #1 may transmit capability information to Cell #1. Here, the capability information may be capability information related to reception of a downlink signal transmitted from Cell #1 and an SRS transmitted from UE #2. For example, the capability information may be information on whether UE #1 can simultaneously receive a downlink signal and an SRS. For example, the capability information may be information based on simultaneousRx-DataSRS-DiffDLtiming of Table 4 above.

Cell #1 may restrict downlink data scheduling for the UE #1 on a symbol for receiving SRS and one symbol before the symbol on which the SRS is received, based on the received capability information (eg, a symbol for which UE #1 measures CLI based on SRS)

In step S802, UE #2 may transmit SRS to Cell #2.

In step S803, UE #1 may perform CLI measurement based on the SRS transmitted by UE #2. For example, UE #1 may receive the SRS and measure the SRS-RSRP based on the received SRS. UE #1 may consider that a downlink signal transmitted from Cell #1 is not received in one symbol before the symbol for measuring CLI and the symbol for measuring CLI based on SRS. For example, when UE #1 cannot receive a downlink signal and SRS at the same time, UE #1 may consider that downlink signal, transmitted from Cell #1, is not received on a symbol for measuring CLI based on SRS and one symbol before the symbol for measuring CLI.

In step S804, UE #1 may transmit the measured CLI to Cell #1. For example, UE #1 may transmit the measured SRS-RSRP to Cell #1.

2. Second Example of the Disclosure of the Present Specification

Hereinafter, a method for reducing the reception implementation complexity of the terminal when the terminal measures SRS-RSRP will be described.

For example, the SRS-RSRP measurement may be defined as follows.

The linear average of the power contribution of the SRS to be measured for the configured resource element within the measurement frequency bandwidth considered in the time resource in the configured measurement occasions.

Table 4 may be an example of an SRS configuration used for SRS transmission. For example, the UE may transmit SRS based on the SRS configuration of Table 4.

TABLE 4

| Parameter | Candidate values |
| --- | --- |
| Number of SRS port | 1, 2, 4 |
| Number of symbol | 1, 2, 4 |
| Repetition factor | 1, 2, 4 |
| Periodicity and offset | sl1 NULL, |
| | sl2 INTEGER(0 . . . 1), |
| | sl4 INTEGER(0 . . . 3), |
| | sl5 INTEGER(0 . . . 4), |
| | sl8 INTEGER(0 . . . 7), |
| | sl10 INTEGER(0 . . . 9), |
| | sl16 INTEGER(0 . . . 15), |
| | sl20 INTEGER(0 . . . 19), |
| | sl32 INTEGER(0 . . . 31), |
| | sl40 INTEGER(0 . . . 39), |
| | sl64 INTEGER(0 . . . 63), |
| | sl80 INTEGER(0 . . . 79), |
| | sl160 INTEGER(0 . . . 159), |
| | sl320 INTEGER(0 . . . 319), |
| | sl640 INTEGER(0 . . . 639), |
| | sl1280 INTEGER(0 . . . 1279), |
| | sl2560 INTEGER(0 . . . 2559) |

In Table 4, Number of SRS port may be the number of antenna ports used for SRS transmission. Number of symbol may be the number of symbols used for SRS transmission. Repetition factor may be the number of times the SRS is repeatedly transmitted. Periodicity and offset may be an SRS transmission period and an offset used for SRS transmission. "sl" in sl1, sl2, . . . , sl2560 may mean a slot. An integer after sl means a period, and an integer in ( ) in INTEGER( ) may mean an offset. A unit of a period and a unit of an offset may be a slot.

Candidate values mean candidate values that can be used for each parameter (eg, Number of SRS port, Number of symbol, Repetition factor, and Periodicity and offset). For example, 1, 2, or 4 may be used for the Number of SRS port.

According to the SRS configuration of Table 4, combinations of parameters having various values may be used for SRS transmission. For example, a combination of three Number of SRS ports, three Number of symbols, three repetition factors, 17 periodicities, and various offsets corresponding to each periodicity may be used for SRS transmission.

In order for the UE to perform SRS-RSRP measurement, the UE should be able to perform an SRS reception operation for all these SRS transmission combinations. In order for the terminal to perform the SRS reception operation for all these SRS transmission combinations, the receiver or transceiver of the terminal should be implemented to perform the reception operation for all SRS transmission combinations. Then, the implementation complexity of the terminal may increase. That is, the complexity for implementing the reception performance of the terminal may increase.

The SRS reception configuration for lowering the reception implementation complexity (ie, implementation complexity of reception performance of the terminal) for SRS-RSRP measurement of the terminal will be described below.

In order to reduce the reception implementation complexity of the UE, the UE measuring SRS-RSRP may measure SRS-RSRP by assuming that the number of SRS ports is 1 regardless of the transmission SRS configuration. For example, the reception performance of the terminal may be implemented to use only one SRS port when performing SRS-RSRP measurement.

Alternatively, the base station may signal SRS-RSRP measurement resource configuration to the terminal by fixing the number of SRS ports to 1 in SRS-RSRP measurement resource configuration. Here, the SRS-RSRP measurement resource information is information transmitted by the base station to the terminal, and may mean information on a resource to be used by the terminal to measure the SRS-RSRP. For example, the base station may include information that the number of SRS port is 1 in the SRS-RSRP measurement resource information and transmit it to the terminal. The SRS-RSRP measurement resource information may be transmitted while being included in the configuration information of step S902 in FIG. 9.

The UE may receive the SRS for only one symbol among the symbols in which the SRS is transmitted and measure the SRS-RSRP. And, the terminal may report the measured SRS-RSRP to the base station. For example, in the case of a terminal that measures SRS-RSRP with respect to the number of symbols in which SRS is transmitted, the terminal may receive SRS for only one symbol among transmitted SRS symbols, measure SRS-RSRP, and report it to the base station.

The period for measuring the SRS-RSRP may be set to all the periods shown in the example of Table 4, or set to [5, 10, 20, 40, 80, 160] slot among all the periods shown in the example of Table 4. For example, the UE may measure the SRS-RSRP based on 6 periods (ie, [5, 10, 20, 40, 80, 160] slot) and report the measured SRS-RSRP to the base station.

In summary, the UE may perform an operation of receiving the SRS based on the measurement parameters as in the example shown in Table 5. For example, when measuring the SRS-RSRP, the UE may perform a reception implementation operation based on the conditions according to the examples in Table 5 below.

TABLE 5

| Measurement parameter | UE receiver for SRS-RSRP |
|---|---|
| Number of SRS port | 1 |
| Number of symbol | 1 |
| Repetition number | 1 |
| Periodicity and offset | sl5 INTEGER(0 . . . 4), sl10 INTEGER(0 . . . 9), sl20 INTEGER(0 . . . 19), sl40 INTEGER(0 . . . 39), sl80 INTEGER(0 . . . 79), sl160 INTEGER(0 . . . 159) |

Table 5 may be an example of the above-described SRS-RSRP measurement resource configuration. In Table 5, Number of SRS port may be the number of antenna ports used for SRS measurement. Number of symbol may be the number of symbols used for SRS measurement. The repetition factor may be the number of times the SRS is repeatedly transmitted. Periodicity and offset may be a period for measuring the SRS and an offset used for measuring the SRS. The UE may receive the SRS measure the SRS-RSRP, based on the SRS measurement combination according to the example of Table 5. In other words, the reception performance of the terminal may be implemented to receive the SRS and measure the SRS-RSRP based on the SRS measurement combination according to the example of Table 5.

The base station may transmit SRS configuration related information to the terminal measuring SRS-RSRP. For example, the base station may transmit the information based on the example of Table 6 to the terminal for measuring the SRS-RSRP to the terminal. That is, the base station may set parameters used for SRS transmission based on the example of Table 6. For reference, in the example of Table 6, "transmission parameter" may mean an SRS transmission parameter of a terminal of a neighboring cell transmitting SRS. The base station may transmit information related to the transmission parameter of the SRS used by the terminal (the terminal of the adjacent cell) transmitting the SRS to the terminal measuring the SRS-RSRP.

TABLE 6

| Transmission parameter | Candidate values |
|---|---|
| Number of SRS port | 1 |
| Number of symbol | 1 |
| Repetition factor | 1 |
| Periodicity and offset | sl5 INTEGER(0 . . . 4), sl10 INTEGER(0 . . . 9), sl20 INTEGER(0 . . . 19), sl40 INTEGER(0 . . . 39), sl80 INTEGER(0 . . . 79), sl160 INTEGER(0 . . . 159) |

In the example of Table 6, Number of SRS port may be the number of antenna ports used for SRS measurement. Number of symbol may be the number of symbols used for SRS measurement. The repetition factor may be the number of times the SRS is repeatedly transmitted. Periodicity and offset may be a period for measuring SRS and an offset used for measuring SRS. Summarizing the examples of Tables 5 and 6, the reception performance of the terminal may be implemented to measure the SRS-RSRP based on the SRS measurement combination according to the example of Table 5. And, the base station may transmit SRS configuration related information as shown in the example of Table 6 to the terminal. The SRS configuration related information as in the example of Table 6 may indicate information on the transmission parameter of the SRS used by the terminal transmitting the SRS. Then, the terminal may receive the SRS from the terminal of the adjacent cell based on the SRS configuration related information received from the base station, and may perform SRS-based measurement.

Figure 9:
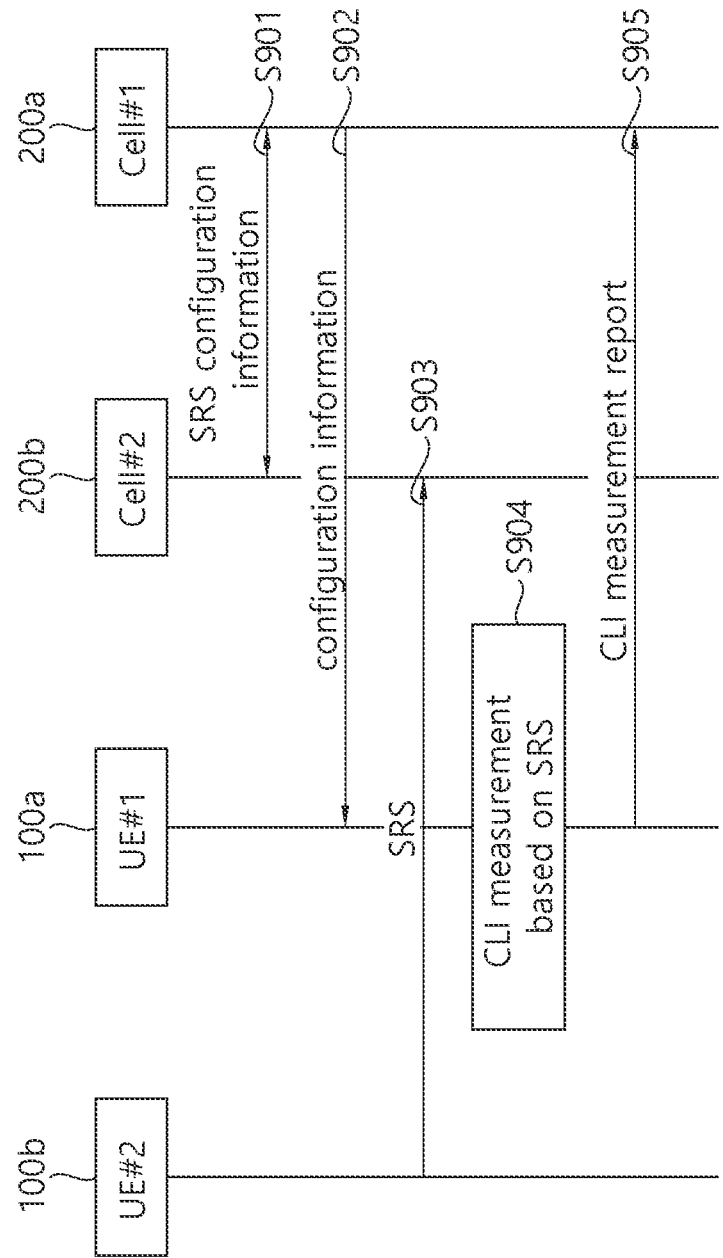
FIG. 9 shows a signal flow diagram based on a second example of the disclosure of the present specification.

FIG. 9 shows a signal flow diagram based on a second example of the disclosure of the present specification.

UE #1 100a may be UE #1 100a of FIG. 6. UE #2 100b may be UE #2 100b of FIG. 6. Cell #1 200a may be Cell #1 200a of FIG. 6. Cell #2 200b may be Cell #2 200b of FIG. 6. Hereinafter, reference numerals of UE #1 100a, UE #2 100b, Cell #1 200a, and Cell #1 200a will be omitted and described.

In step S901, the first cell and the second cell may exchange SRS configuration information. Here, the SRS configuration information may be information on timing at which the UE transmits the SRS. For example, Cell #2 may transmit information on timing at which UE #2 transmits SRS to Cell #1. Cell #1 may transmit information on timing at which UE #1 transmits SRS to Cell #2.

In step S902, Cell #1 may transmit configuration information to UE #1 based on the SRS configuration information received from Cell #2. Configuration information may include timing information for a symbol to receive SRS. The timing information on the symbol for receiving the SRS may include timing information on the symbol for which the UE #1 performs CLI measurement based on the SRS. The configuration information received by UE #1 may be information based on the example of Table 6.

In step S903, UE #2 may transmit SRS to Cell #2.

In step S904, UE #1 may perform CLI measurement based on the SRS transmitted by UE #2. For example, UE #1 may receive the SRS and measure the SRS-RSRP based on the received SRS. UE #1 may perform CLI measurement based on configuration information received from Cell #1. For example, UE #1 may receive an SRS from UE #2 based on one antenna port, one symbol, and one repetition number, and may perform CLI measurement. For example, UE #1 may measure SRS-RSRP based on the SRS from UE #2.

In step S905, UE #1 may transmit the measured CLI to Cell #1. For example, UE #1 may transmit the measured SRS-RSRP to Cell #1.

3. Third Example of the Disclosure of the Present Specification

Hereinafter, a third example to which the contents described in the first example and/or the second example of the disclosure of the present specification are applied will be described. For reference, the contents described below are only examples of operations performed by the terminal and the base station (eg, serving cell, adjacent cell, etc.). Accordingly, the terminal and the base station may perform the operations described in the first and second examples described above, even if not described below.

Figure 10:
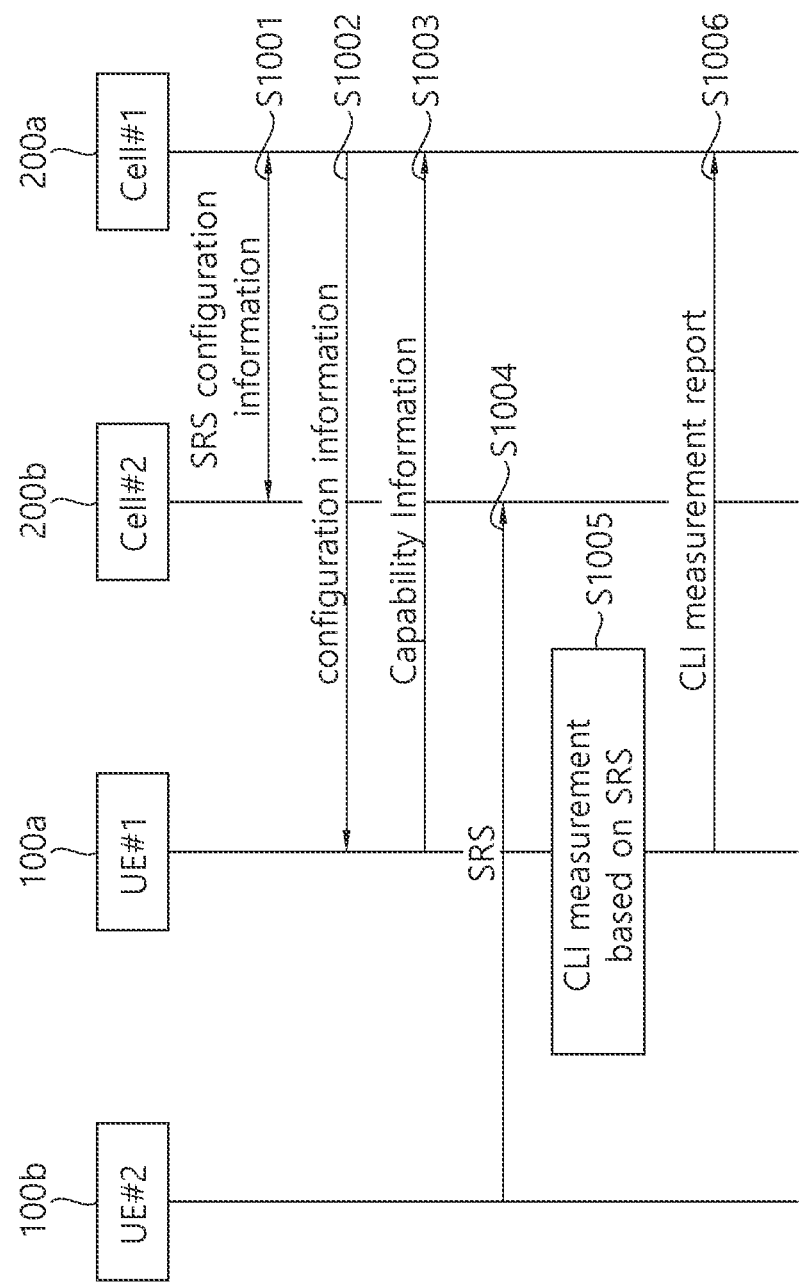
FIG. 10 shows a signal flow diagram based on a third example of the disclosure of the present specification.

FIG. 10 shows a signal flow diagram based on a third example of the disclosure of the present specification.

A terminal (eg, UE #1 100a or UE #100b in FIGS. 6, 8, and 9) and a base station (eg, Cell #1 200a or Cell #200b in FIGS. 6, 8, and 9))) may perform an operation based on the contents described in the first example and/or the second example.

UE #1 100*a* may be UE #1 100*a* of FIG. 6. UE #2 100*b* may be UE #2 100*b* of FIG. 6. Cell #1 200*a* may be Cell #1 200*a* of FIG. 6. Cell #2 200*b* may be Cell #2 200*b* of FIG. 6. Hereinafter, reference numerals of UE #1 100*a*, UE #2 100*b*, Cell #1 200*a*, and Cell #1 200*a* will be omitted and described.

In step S1001, the first cell and the second cell may exchange SRS configuration information. Here, the SRS configuration information may be information on timing at which the UE transmits the SRS. For example, Cell #2 may transmit information on timing at which UE #2 transmits SRS to Cell #1. Cell #1 may transmit information on timing at which UE #1 transmits SRS to Cell #2.

In step S1002, Cell #1 may transmit configuration information to UE #1 based on the SRS configuration information received from Cell #2. Configuration information may include timing information for a symbol to receive SRS. The timing information on the symbol for receiving the SRS may include timing information on the symbol for which the UE #1 performs CLI measurement based on the SRS. The configuration information received by UE #1 may be information based on the example of Table 6.

In step S1003, UE #1 may transmit capability information to Cell #1. Here, the capability information may be capability information related to reception of a downlink signal transmitted from Cell #1 and an SRS transmitted from UE #2. For example, the capability information may be information on whether UE #1 can simultaneously receive a downlink signal and an SRS. For example, the capability information may be information based on the example of simultaneousRxDataSRS-DiffDLtiming in Table 4 above.

Cell #1 may restrict downlink data scheduling to the UE #1 for a symbol for receiving SRS (eg, a symbol for which UE #1 measures CLI based on SRS) and one symbol before the symbol from which SRS is received to UE #1, based on the received capability information.

In step S1004, UE #2 may transmit SRS to Cell #2.

In step S1005, UE #1 may perform CLI measurement based on the SRS transmitted by UE #2. For example, UE #1 may receive the SRS and measure the SRS-RSRP based on the received SRS. UE #1 may perform CLI measurement based on configuration information received from Cell #1. For example, UE #1 may receive an SRS from UE #2 and may perform CLI measurement, based on one antenna port, one symbol, and one repetition number. For example, UE #1 may measure SRS-RSRP based on the SRS from UE #2.

UE #1 may consider that a downlink signal transmitted from Cell #1 is not received in one symbol before the symbol for measuring CLI and the symbol for measuring CLI based on SRS. For example, when UE #1 cannot receive a downlink signal and SRS at the same time, UE #1 may consider that the downlink signal transmitted from Cell #1 is not received on a symbol for measuring CLI based on SRS and one symbol before a symbol for measuring CLI.

In step S1006, UE #1 may transmit the measured CLI to Cell #1. For example, UE #1 may transmit the measured SRS-RSRP to Cell #1.

For reference, the operation of the UE described in this specification (eg, UE #1 100*a* or UE #2 100*b* in FIGS. 6 and 8 to 10) may be implemented by the apparatus of FIGS. 11 to 16 to be described below. For example, the UE may be the first wireless device 100 or the second wireless device 200 of FIG. 12. For example, operations of a UE described herein may be handled by one or more processors 102 or 202. The operations of the UE described herein may be stored in one or more memories 104 or 204 in the form of instructions/programs (e.g. instructions, executable code) executable by one or more processors 102 or 202. One or more processors 102 or 202 control one or more memories 104 or 204 and one or more transceivers 106 or 206, and execute instructions/programs stored in one or more memories 104 or 204 to be used in the present specification. The operation of the UE described in the disclosure may be performed. In addition, the instructions for performing the operation of the UE described in the disclosure of the present specification may be stored in a non-volatile computer-readable storage medium. The storage medium may be included in one or more memories 104 or 204. And, the instructions recorded in the storage medium may be executed by one or more processors 102 or 202 to perform the operation of the UE described in the disclosure of the present specification.

For reference, the operation of the base station (eg, Cell #1 200*a* or Cell #2 200*b* of FIGS. 6 and 8 to 10) described herein may be implemented by the apparatus of FIGS. 11 to 16 to be described below. For example, the base station may be the first wireless device 100 or the second wireless device 200 of FIG. 12. For example, operations of the base stations described herein may be processed by one or more processors 102 or 202. The operations of the base station described herein may be stored in one or more memories 104 or 204 in the form of instructions/programs (e.g. instruction, executable code) executable by one or more processors 102 or 202. One or more processors 102 or 202 control one or more memories 104 or 204 and one or more transceivers 106 or 206, and execute instructions/programs stored in one or more memories 104 or 204 to be used in the present specification, thereby one or more processors 102 or 202 may perform operations of the base station described in the disclosure of the present specification. In addition, the instructions for performing the operations of the base station described in the disclosure of the present specification may be stored in a non-volatile computer-readable storage medium in which it is recorded. The storage medium may be included in one or more memories 104 or 204. And, the instructions recorded in the storage medium may be executed by one or more processors 102 or 202 to perform the operations of the base station described in the disclosure of the present specification.

III. Examples to which the Disclosure of this Specification is to be Applied While not limited to thereto, the various descriptions, functions, procedures, suggestions, methods, and/or operational flowcharts of the present specification disclosed herein may be applied to in various fields requiring wireless communication/connection (e.g., 5G) between devices.

Hereinafter, a communication system to which the present specification can be applied is described in more detail with reference to the drawings. The same reference numerals in the following drawings/descriptions may illustrate the same or corresponding hardware blocks, software blocks, or functional blocks unless otherwise indicated.

Figure 11:
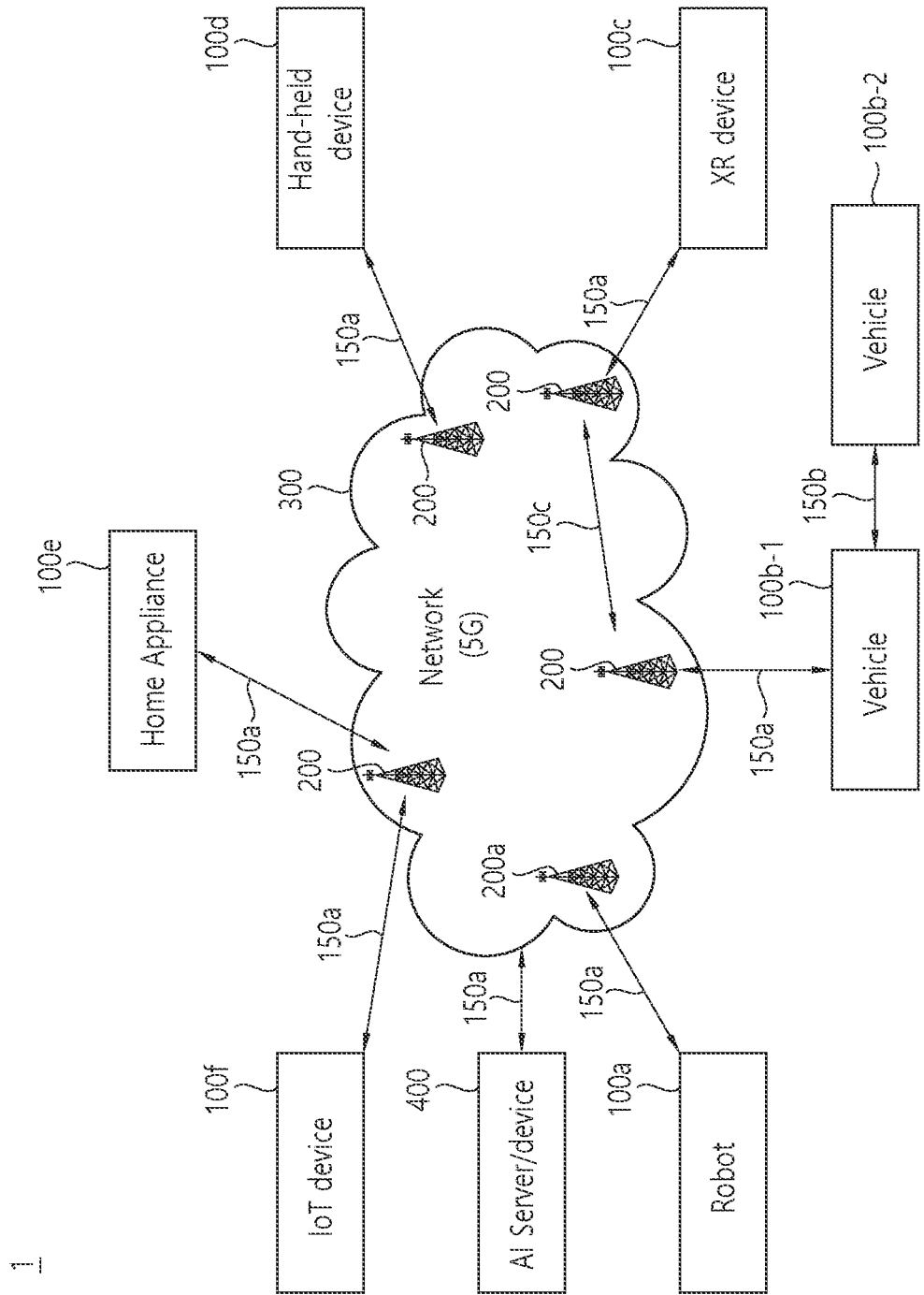
FIG. 11 illustrates a communication system 1 that can be applied to the present specification.

FIG. 11 illustrates a communication system 1 that can be applied to the present specification.

Referring to FIG. 11, a communication system 1 applied to the present specification includes a wireless device, a base station, and a network. Here, the wireless device means a device that performs communication using a wireless access technology (e.g., 5G New RAT (Long Term), Long Term Evolution (LTE)), and may be referred to as a communication/wireless/5G device. Although not limited thereto, the wireless device may include a robot 100a, a vehicle 100b-1, 100b-2, an eXtended Reality (XR) device 100c, a hand-held device 100d, a home appliance 100e, an Internet of Thing (IoT) device 100f, and the AI device/server 400. For example, the vehicle may include a vehicle having a wireless communication function, an autonomous vehicle, a vehicle capable of performing inter-vehicle communication, and the like. Here, the vehicle may include an unmanned aerial vehicle (UAV) (e.g., a drone). XR device may include AR (Augmented Reality)/VR (Virtual Reality)/MR (Mixed Reality) device. XR device may be implemented in the form of Head-Mounted Device (HMD), Head-Up Display (HUD), television, smartphone, a computer, a wearable device, a home appliance, a digital signage, a vehicle, a robot, and the like. The mobile device may include a smartphone, a smart pad, a wearable device (e.g., smart watch, smart glasses), and a computer (e.g., a laptop, etc.). The home appliance may include a TV, a refrigerator, a washing machine, and the like. IoT devices may include sensors, smart meters, and the like. For example, the base station and the network may be implemented as a wireless device, and the specific wireless device 200a may operate as a base station/network node to other wireless devices.

The wireless devices 100a to 100f may be connected to the network 300 through the base station 200. AI (Artificial Intelligence) technology may be applied to the wireless devices 100a to 100f, and the wireless devices 100a to 100f may be connected to the AI server 400 through the network 300. The network 300 may be configured using a 3G network, a 4G (e.g. LTE) network, a 5G (e.g. NR) network, or the like. The wireless devices 100a-100f may communicate with each other via the base station 200/network 300, but may also communicate directly (e.g. sidelink communication) without passing through the base station/network. For example, the vehicles 100b-1 and 100b-2 may perform direct communication (e.g. vehicle to vehicle (V2V)/vehicle to everything (V2X) communication). In addition, the IoT device (e.g. sensor) may directly communicate with another IoT device (e.g. sensor) or another wireless device 100a to 100f.

A wireless communication/connection 150a, 150b, 150c may be performed between the wireless devices 100a-100f/base station 200 and base station 200/base station 200. Here, the wireless communication/connection is implemented based on various wireless connections (e.g., 5G NR) such as uplink/downlink communication 150a, sidelink communication 150b (or D2D communication), inter-base station communication 150c (e.g. relay, integrated access backhaul), and the like. The wireless device and the base station/wireless device, the base station, and the base station may transmit/receive radio signals to each other through the wireless communication/connections 150a, 150b, and 150c. For example, wireless communications/connections 150a, 150b, 150c may transmit/receive signals over various physical channels. To this end, based on various proposals of the present specification, At least some of various configuration information setting processes for transmitting/receiving a wireless signal, various signal processing processes (e.g., channel encoding/decoding, modulation/demodulation, resource mapping/demapping, etc.) may be performed.

Figure 12:
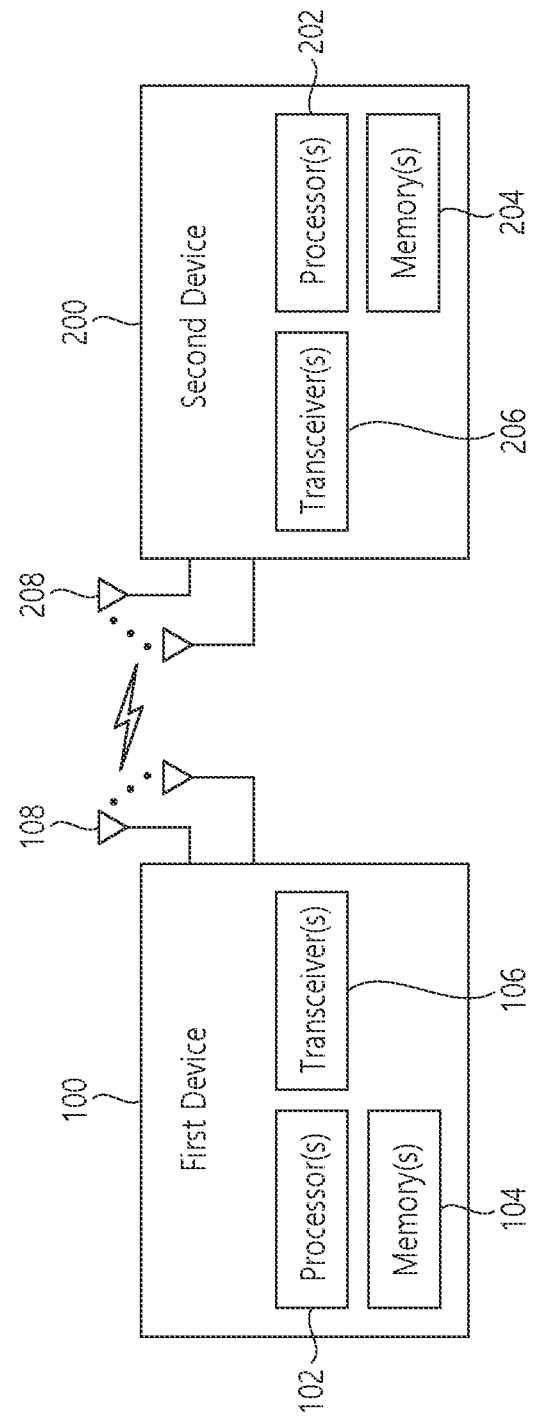
FIG. 12 illustrates an example of a wireless device that can be applied to the present specification.

FIG. 12 illustrates an example of a wireless device that can be applied to the present specification.

Referring to FIG. 12, the first wireless device 100 and the second wireless device 200 may transmit and receive wireless signals through various wireless access technologies (e.g., LTE and NR). Here, the {first wireless device 100 and the second wireless device 200} may refer to the {wireless device 100x, the base station 200} and/or the {wireless device 100x, the wireless device 100x of FIG. 11}. Alternatively, the first wireless device 100 may correspond to the UE, AMF, SMF, or UPF described in the disclosure of the present specification. In addition, the second wireless device 200 may correspond to a UE, AMF, SMF, or UPF that communicates with the first wireless device 100. The first wireless device 100 includes one or more processors 102 and one or more memories 104, and may further include one or more transceivers 106 and/or one or more antennas 108. The processor 102 controls the memory 104 and/or the transceiver 106 and may be configured to implement the descriptions, functions, procedures, suggestions, methods and/or operational flowcharts disclosed herein. For example, the processor 102 may process the information in the memory 104 to generate a first information/signal, and then transmit the wireless signal including the first information/signal through the transceiver 106. In addition, the processor 102 may receive the radio signal including a second information/signal through the transceiver 106 and store the information obtained from the signal processing of the second information/signal in the memory 104. The memory 104 may be connected to the processor 102 and may store various information related to the operation of the processor 102. For example, the memory 104 may store software code that includes instructions to perform some or all of the processes controlled by the processor 102 or to perform descriptions, functions, procedures, suggestions, methods and/or operational flowcharts disclosed herein. Here, the processor 102 and memory 104 may be part of a communication modem/circuit/chip designed to implement wireless communication technology (e.g., LTE, NR). The transceiver 106 may be coupled with the processor 102 and may transmit and/or receive wireless signals via one or more antennas 108. The transceiver 106 may include a transmitter and/or a receiver. The transceiver 106 may be described as being mixed with a radio frequency (RF) unit. In the present specification, a wireless device may mean a communication modem/circuit/chip.

The second wireless device 200 may include one or more processors 202, one or more memories 204, and may further include one or more transceivers 206 and/or one or more antennas 208. The processor 202 controls the memory 204 and/or the transceiver 206 and may be configured to implement the descriptions, functions, procedures, suggestions, methods and/or operational flowcharts disclosed herein. For example, the processor 202 may process the information in the memory 204 to generate third information/signal, and then transmit a wireless signal including the third information/signal through the transceiver 206. In addition, the processor 202 may receive the radio signal including the fourth information/signal through the transceiver 206 and then store the information obtained from the signal processing of the fourth information/signal in the memory 204. The memory 204 may be connected to the processor 202 and store various information related to the operation of the processor 202. For example, the memory 204 may store software code that include instructions to perform some or all of the processes controlled by the processor 202 or to perform descriptions, functions, procedures, suggestions, methods and/or operational flowcharts disclosed herein. Here, processor 202 and memory 204 may be part of a communication modem/circuit/chip designed to implement wireless communication technology (e.g., LTE, NR). The transceiver 206 may be coupled with the processor 202 and may transmit and/or receive wireless signals via one or more antennas 208. The transceiver 206 may include a transmitter and/or a receiver. The transceiver 206 may be described being mixed with an RF unit. In the present specification, a wireless device may mean a communication modem/circuit/chip.

Hereinafter, hardware elements of the wireless devices 100 and 200 will be described in more detail. One or more protocol layers may be implemented by one or more processors 102, 202. The hardware elements of the wireless devices 100 and 200 are not limited thereto. For example, one or more processors 102 and 202 may implement one or more layers (e.g., functional layers such as PHY, MAC, RLC, PDCP, RRC, SDAP). One or more processors 102, 202 may generate one or more Protocol Data Units (PDUs) and/or one or more Service Data Units (SDUs) based on the descriptions, functions, procedures, suggestions, methods and/or operational flowcharts disclosed herein. One or more processors 102, 202 may generate messages, control information, data or information in accordance with the descriptions, functions, procedures, suggestions, methods and/or operational flowcharts disclosed herein. One or more processors 102, 202 may generate signals (e.g., baseband signals) including PDUs, SDUs, messages, control information, data or information in accordance with the functions, procedures, suggestions and/or methods disclosed herein, and may provide the signals to one or more transceivers 106 and 206. One or more processors 102, 202 may receive signals (e.g., baseband signals) from one or more transceivers 106, 206 and may obtain the PDU, the SDU, the message, the control information, the data, or the information based on a description, functions, procedures, suggestions, methods, and/or operational flowcharts disclosed herein.

One or more processors 102, 202 may be referred to as a controller, microcontroller, microprocessor, or microcomputer. One or more processors 102, 202 may be implemented by hardware, firmware, software, or a combination thereof. For example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in one or more processors 102, 202. The descriptions, functions, procedures, suggestions, methods, and/or operational flowcharts disclosed herein may be implemented using firmware or software, and the firmware or software may be implemented to include modules, procedures, functions, and the like. Firmware or software configured to perform the descriptions, functions, procedures, suggestions, methods, and/or operational flowcharts disclosed herein may be included in one or more processors (102, 202), or may be stored in one or more memories (104, 204) and be executed by the processor (102, 202). The descriptions, functions, procedures, suggestions, methods, and/or operational flowcharts disclosed herein may be implemented using firmware or software in the form of code, instructions, and/or a set of instructions.

One or more memories 104, 204 may be coupled with one or more processors 102, 202 and may store various forms of data, signals, messages, information, programs, codes, instructions, and/or instructions. One or more memories 104, 204 may be comprised of ROM, RAM, EPROM, flash memory, hard drive, registers, cache memory, computer readable storage medium, and/or combinations thereof. One or more memories 104, 204 may be located inside and/or outside one or more processors 102, 202. In addition, one or more memories 104, 204 may be coupled with one or more processors 102, 202 through various techniques, such as a wired or wireless connection.

One or more transceivers 106 and 206 may transmit user data, control information, wireless signals/channels, etc., as mentioned in the methods and/or operational flowcharts of this document, to one or more other devices. One or more transceivers 106 and 206 may receive, from one or more other devices, user data, control information, wireless signals/channels, etc., as mentioned in the descriptions, functions, procedures, suggestions, methods and/or operational flowcharts disclosed herein. For example, one or more transceivers 106 and 206 may be coupled with one or more processors 102 and 202 and may transmit and receive wireless signals. For example, one or more processors 102 and 202 may control one or more transceivers 106 and 206 to transmit user data, control information or wireless signals to one or more other devices. In addition, one or more processors 102 and 202 may control one or more transceivers 106 and 206 to receive user data, control information or wireless signals from one or more other devices. In addition, one or more transceivers 106, 206 may be coupled with one or more antennas 108, 208. One or more transceivers 106, 206 may be configured to transmit and receive user data, control information, wireless signals/channels, etc., which are mentioned in the procedures, functions, descriptions, suggestions, methods and/or operational flowcharts, and the like via one or more antennas 108, 208. In the present disclosure, one or more antennas may be a plurality of physical antennas or a plurality of logical antennas (e.g., antenna ports). One or more transceivers 106, 206 may convert the received wireless signal/channel or the like from RF band signal to a baseband signal to process user data, control information, wireless signals/channels, etc. in an one or more processors 102, 202. One or more transceivers 106 and 206 may use the one or more processors 102 and 202 to convert processed user data, control information, wireless signals/channels, etc. from baseband signals to RF band signals. To this end, one or more transceivers 106 and 206 may include (analog) oscillators and/or filters.

Figure 13:
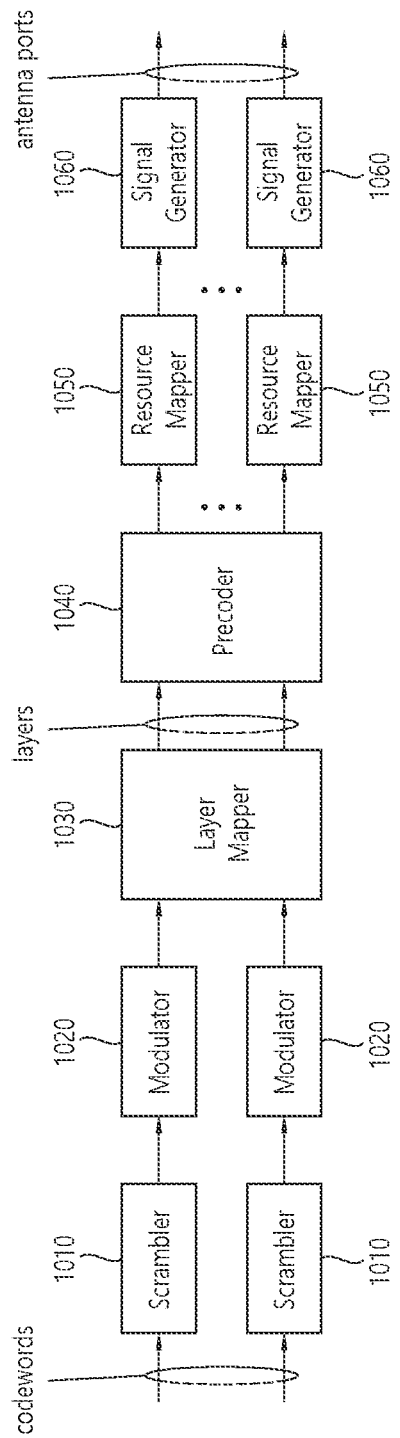
FIG. 13 illustrates an example of a signal processing circuit for a transmission signal.

FIG. 13 illustrates an example of a signal processing circuit for a transmission signal.

Referring to FIG. 13, the signal processing circuit 1000 may include a scrambler 1010, a modulator 1020, a layer mapper 1030, a precoder 1040, a resource mapper 1050, and a signal generator 1060. Although not limited thereto, the operations/functions of FIG. 13 may be performed in the processor (102, 202), the memory (104, 204) and/or transceiver (106, 206) of FIG. 12. The hardware element of FIG. 13 may be implemented in the processors 102 and 202 and/or the transceivers 106 and 206 of FIG. 12. For example, blocks 1010-1060 may be implemented in the processors 102, 202 of FIG. 12. Also, blocks 1010-1050 may be implemented in the processors 102 and 202 of FIG. 12, and block 1060 may be implemented in the transceivers 106 and 206 of FIG. 12.

The codeword may be converted into a wireless signal through the signal processing circuit 1000 of FIG. 13. Here, the codeword is an encoded bit sequence of the information block. The information block may include a transport block (e.g., a UL-SCH transport block and a DL-SCH transport block). The wireless signal may be transmitted through various physical channels (e.g., PUSCH, PDSCH).

In detail, the codeword may be converted into a scrambled bit sequence by the scrambler 1010. The scramble sequence used for scramble is generated based on the initialization value, and the initialization value may include ID information of the wireless device. The scrambled bit sequence may be modulated into a modulation symbol sequence by the modulator 1020. The modulation scheme may include pi/2-Binary Phase Shift Keying (pi/2-BPSK), m-Phase Shift Keying (m-PSK), m-Quadrature Amplitude Modulation (m-QAM), and the like. The complex modulation symbol sequence may be mapped to one or more transport layers by the layer mapper 1030. The modulation symbols of each transport layer may be mapped (precoding) to the corresponding antenna port (s) by the precoder 1040. The output z of the precoder 1040 may be obtained by multiplying the output y of the layer mapper 1030 by the precoding matrix W of N*M. Where N is the number of antenna ports and M is the number of transport layers. Here, the precoder 1040 may perform precoding after performing transform precoding (e.g., DFT transform) on complex modulation symbols. Also, the precoder 1040 may perform precoding without performing transform precoding.

The resource mapper 1050 may map modulation symbols of each antenna port to time-frequency resources. The time-frequency resource may include a plurality of symbols (e.g., CP-OFDMA symbols, DFT-s-OFDMA symbols) in the time domain, and may include a plurality of subcarriers in the frequency domain. The signal generator 1060 generates a radio signal from the mapped modulation symbols, and the generated radio signal may be transmitted to another device through each antenna. To this end, the signal generator 1060 may include an Inverse Fast Fourier Transform (IFFT) module, a Cyclic Prefix (CP) inserter, a Digital-to-Analog Converter (DAC), a frequency uplink converter, and the like.

The signal processing procedure for the received signal in the wireless device may be configured in the reverse manner of the signal processing procedures 1010˜1060 of FIG. 13. For example, a wireless device (e.g., 100 and 200 of FIG. 12) may receive a wireless signal from the outside through an antenna port/transceiver. The received wireless signal may be converted into a baseband signal through a signal recoverer. To this end, the signal recoverer may include a frequency downlink converter, an analog-to-digital converter (ADC), a CP canceller, and a fast fourier transform (FFT) module. Thereafter, the baseband signal may be restored to a codeword through a resource de-mapper process, a postcoding process, a demodulation process, and a de-scramble process. The codeword may be restored to the original information block through decoding. Thus, signal processing circuitry (not shown) for the received signal may include a signal recoverer, a resource de-mapper, a postcoder, a demodulator, a de-scrambler and a decoder.

Figure 14:
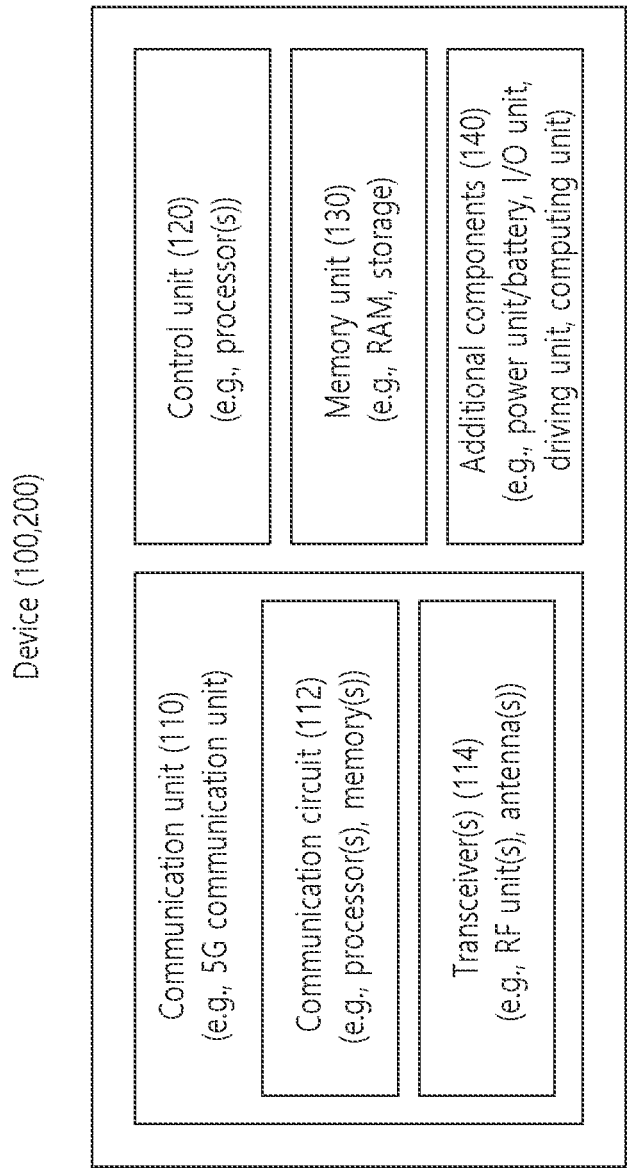
FIG. 14 illustrates another example of a wireless device that can be applied to the present specification.

FIG. 14 illustrates another example of a wireless device that can be applied to the present specification.

The wireless device may be implemented in various forms according to use-examples/services (refer to FIG. 11).

Referring to FIG. 14, the wireless devices 100 and 200 correspond to the wireless devices 100 and 200 of FIG. 12, and the wireless devices 100 and 200 may be configured with various elements, components, units, and/or modules. For example, the wireless device 100, 200 may include a communication unit 110, a control unit 120, a memory unit 130, and additional components 140. The communication unit may include communication circuit 112 and transceiver (s) 114. For example, the communication circuit 112 may include one or more processors 102, 202 and/or one or more memories 104, 204 of FIG. 12. For example, the transceiver (s) 114 may include one or more transceivers 106, 206 and/or one or more antennas 108, 208 of FIG. 12. The control unit 120 is electrically connected to the communication unit 110, the memory unit 130, and the additional components 140, and controls various operations of the wireless device. For example, the control unit 120 may control the electrical/mechanical operation of the wireless device based on the program/code/command/information stored in the memory unit 130. In addition, the control unit 120 may transmit information stored in the memory unit 130 to the outside (e.g., another communication device) through the communication unit 110 through a wireless/wired interface. The control unit 120 may store the information received through the wireless/wired interface from the outside (e.g., another communication device) through the communication unit 110 in the memory unit 130. For example, the control unit 120 may include one or more processors 102 and 202 and/or one or more memories 104 and 204 of FIG. 12. For example, the memory unit 130 may include one or more memories 104 and 204 of FIG. 12.

The additional components 140 may be variously configured according to the type of the wireless device. For example, the additional components 140 may include at least one of a power unit/battery, an input/output unit, a driving unit, and a computing unit. Although not limited thereto, the wireless device may be implemented in the form of a robot (FIG. 11, 100*a*), a vehicle (FIG. 11, 100*b*-1, 100*b*-2), an XR device (FIG. 11, 100*c*), a portable device (FIG. 11, 100*d*), a home appliance. (FIG. 11, 100*e*), IoT devices (FIG. 11, 1000, terminals for digital broadcasting, hologram devices, public safety devices, MTC devices, medical devices, fintech devices (or financial devices), security devices, climate/environment devices, an AI server/device (FIGS. 12 and 400), a base station (FIGS. 12 and 200), a network node, and the like. The wireless device may be used in a mobile or fixed location depending on the usage-example/service.

In FIG. 14, various elements, components, units/units, and/or modules in the wireless devices 100 and 200 may be entirely interconnected through a wired interface, or at least a part of them may be wirelessly connected through the communication unit 110. For example, the control unit 120 and the communication unit 110 are connected by wire in the wireless device 100 or 200, and the control unit 120 and the first unit (e.g., 130 and 140) are connected wirelessly through the communication unit 110. In addition, each element, component, unit/unit, and/or module in wireless device 100, 200 may further include one or more elements. For example, the control unit 120 may be composed of one or more processor sets. For example, the control unit 120 may be configured as a set of a communication control processor, an application processor, an electronic control unit (ECU), a graphics processing processor, a memory control processor, and the like. As another example, the memory unit 130 may include random access memory (RAM), dynamic RAM (DRAM), read only memory (ROM), flash memory, volatile memory, and non-volatile memory and/or combinations thereof.

Figure 15:
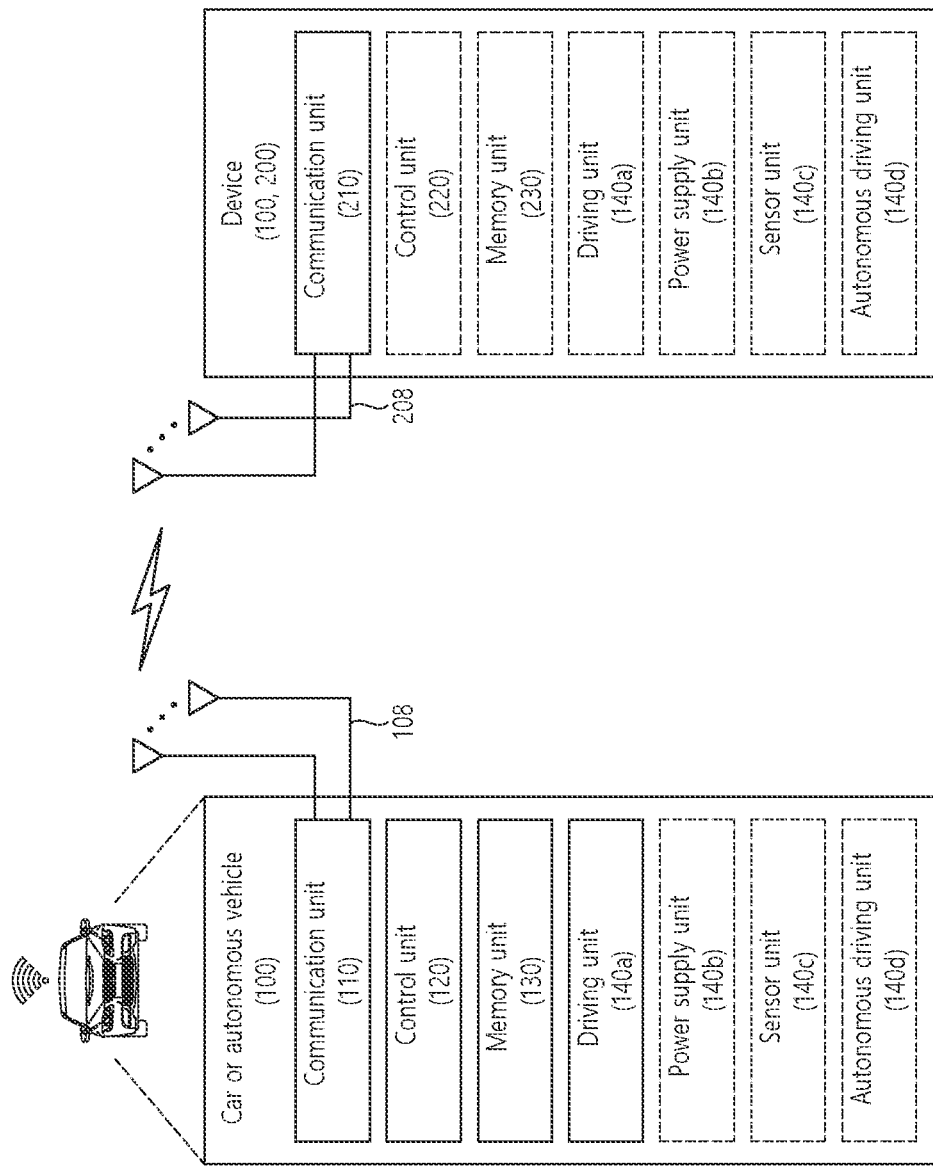
FIG. 15 illustrates an example of a vehicle or an autonomous vehicle that can be applied to the present specification.

FIG. 15 illustrates an example of a vehicle or an autonomous vehicle that can be applied to the present specification.

FIG. 15 illustrates a vehicle or autonomous vehicle applied to the disclosure of this specification. The vehicle or autonomous driving vehicle may be implemented as a mobile robot, a vehicle, a train, an aerial vehicle (AV), a ship, and the like.

Referring to FIG. 15, the vehicle or the autonomous vehicle 100 may include an antenna unit 108, a communication unit 110, a control unit 120, a driving unit 140*a*, a power supply unit 140*b*, a sensor unit 140*c*, and autonomous driving unit 140*d*. The antenna unit 108 may be configured as part of the communication unit 110. The blocks 110/130/140a to 140d may correspond to blocks 110/130/140 of FIG. 14, respectively.

The communication unit 110 may transmit or receive signals (e.g., data, control signals, etc.) with external devices, such as base stations (e.g. base stations, road side units, etc.), servers, and the like. The control unit 120 may control various elements of the vehicle or the autonomous vehicle 100 to perform various operations. The control unit 120 may include an ECU (Electronic Control Unit). The driving unit 140a may cause the vehicle or the autonomous vehicle 100 to drive on the ground. The driving unit 140a may include an engine, a motor, a power train, wheels, a brake, a steering device, and the like. The power supply unit 140b supplies power to the vehicle or the autonomous vehicle 100, and may include a wired/wireless charging circuit, a battery, and the like. The sensor unit 140c may obtain vehicle status, surrounding environment information, user information, and the like. The sensor unit 140c includes an inertial measurement unit (IMU) sensor, a collision sensor, a wheel sensor, a speed sensor, an inclination sensor, a weight sensor, a heading sensor, a position module, a position forward, and a vehicle forward/reverse sensors, battery sensors, fuel sensors, tire sensors, steering sensors, temperature sensors, humidity sensors, ultrasonic sensors, illuminance sensors, pedal position sensors, and the like. The autonomous driving unit 140d may implement a technology for maintaining a driving lane, a technology for automatically adjusting speed such as adaptive cruise control, a technology for automatically driving along a predetermined route, and automatically setting a route when a destination, and the like.

For example, the communication unit 110 may receive map data, traffic information data, and the like from an external server. The autonomous driving unit 140d may generate an autonomous driving route and a driving plan based on the obtained data. The control unit 120 may control the driving unit 140a to move the vehicle or the autonomous vehicle 100 along the autonomous driving path according to the driving plan (e.g., speed/direction adjustment). During autonomous driving, the communication unit 110 may acquire the latest traffic information data periodically or aperiodically from an external server and may obtain the surrounding traffic information data from the surrounding vehicles. In addition, during autonomous driving, the sensor unit 140c may acquire vehicle state and surrounding environment information. The autonomous driving unit 140d may update the autonomous driving route and the driving plan based on the newly obtained data/information. The communication unit 110 may transmit information regarding a vehicle location, an autonomous driving route, a driving plan, and the like to an external server. The external server may predict traffic information data in advance using AI technology or the like based on information collected from the vehicle or autonomous vehicles, and provide the predicted traffic information data to the vehicle or autonomous vehicles.

Figure 16:
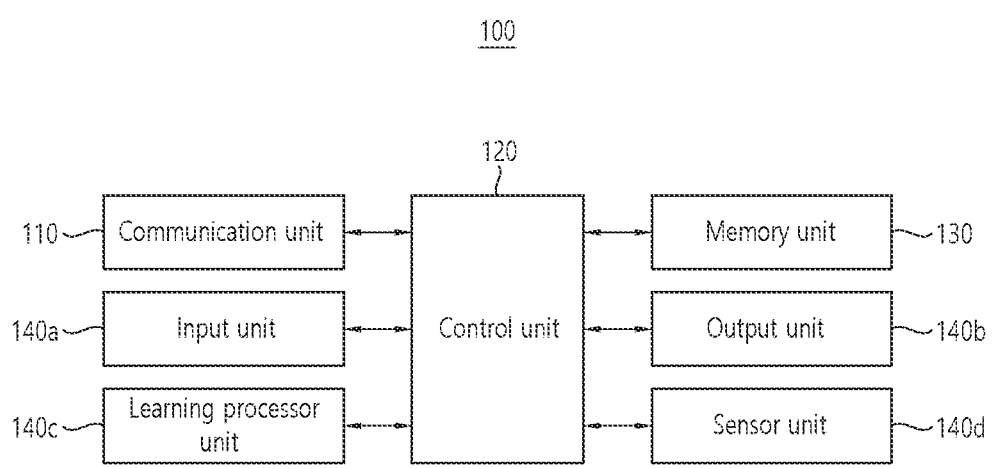
FIG. 16 illustrates an example of an AI device that can be applied to the disclosure of the present specification.

FIG. 16 illustrates an example of an AI device that can be applied to the disclosure of the present specification.

FIG. 16 illustrates an example of an AI device applied to the disclosure of the present specification. An AI device may be implemented as a fixed device or a mobile device, such as TVs, projectors, smartphones, PCs, laptops, digital broadcasting terminals, tablet PCs, wearable devices, set-top boxes (STBs), radios, washing machines, refrigerators, digital signage, robots, vehicles, and the like.

Referring to FIG. 16, the AI device 100 includes a communication unit 110, a control unit 120, a memory unit 130, an input/output unit 140a/140b, a learning processor unit 140c, and a sensor unit 140d. Blocks 110 to 130/140a to 140d respectively correspond to blocks 110 to 130/140 of FIG. 14.

The communication unit 110 communicates may transmit or receive wired signals and wireless signals (e.g., sensor information, user input, learning model, control signal, etc.) with external devices such as another AI device (e.g., FIG. 1, 100x, 200, 400) or an AI server (e.g., 400 of FIG. 11) by using a wired or wireless communication technology. To this end, the communication unit 110 may transmit information in the memory unit 130 to an external device, or may transmit a signal received from the external device to the memory unit 130.

The control unit 120 may determine at least one executable operation of the AI device 100 based on the information determined or generated using the data analysis algorithm or the machine learning algorithm. In addition, the control unit 120 may control the components of the AI device 100 to perform the determined operation. For example, the control unit 120 may request, search, receive, or utilize data of the running processor 140c or the memory 130. The control unit 120 may control the components of the AI device 100 to execute a predicted or desirable operation among at least one executable operation. In addition, the control unit 120 collects history information including the operation contents of the AI device 100 or the user's feedback on the operation, and stores the information in the memory unit 130 or the running processor unit 140c or transmits the information to an external device such as an AI server (FIG. 11, 400). The collected historical information can be used to update the learning model.

The memory unit 130 may store data supporting various functions of the AI device 100. For example, the memory unit 130 may store data obtained from the input unit 140a, data obtained from the communication unit 110, output data of the learning processor unit 140c, and data obtained from the sensing unit 140. In addition, the memory unit 130 may store control information and/or software code necessary for operation/execution of the control unit 120.

The input unit 140a may obtain various types of data from the outside of the AI device 100. For example, the input unit 140a may acquire training data for model learning, input data to which the training model is applied, and the like. The input unit 140a may include a camera, a microphone, and/or a user input unit. The output unit 140b may generate an output related to sight, hearing, or touch. The output unit 140b may include a display unit, a speaker, and/or a haptic module. The sensing unit 140 may obtain at least one of internal information of the AI device 100, environment information of the AI device 100, and user information using various sensors. The sensing unit 140 may include a proximity sensor, an illumination sensor, an acceleration sensor, a magnetic sensor, a gyro sensor, an inertial sensor, an RGB sensor, an IR sensor, a fingerprint sensor, an ultrasonic sensor, an optical sensor, a microphone, and/or a radar, and the like.

The learning processor unit 140c may train a model composed of artificial neural networks using the training data. The learning processor unit 140c may perform AI processing together with the learning processor unit of the AI server (FIGS. 12 and 400). The learning processor unit 140c may process information received from an external device through the communication unit 110 and/or information stored in the memory unit 130. In addition, the output value of the learning processor unit 140c may be transmitted to the external device through the communication unit 110 and/or stored in the memory unit 130.

As described above, although the embodiments have been described as examples, since the content and scope of this specification will not be limited only to a particular embodiment of this specification, this specification may be amended, modified, or enhanced to other various forms.

In the above exemplary systems, although the methods have been described on the basis of the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing a measurement, the method performed by a first User Equipment (UE) and comprising:
   transmitting, to a serving cell, capability information,
   wherein the capability information indicates a capability of whether the first UE supports a Frequency Division Multiplexing (FDM)-ed reception of a downlink signal transmitted from the serving cell and a Sounding Reference Signal (SRS) transmitted from a second UE; and
   performing CLI (Cross Link Interference) measurement based on the SRS from the second UE,
   wherein based on that the first UE does not support the capability, the first UE is not expected to receive the downlink signal transmitted from the serving cell on a symbol on which the CLI measurement is performed, and on one symbol before the symbol.

2. The method of claim 1,
   wherein, when the FDM-ed reception of the downlink signal and the SRS is not supported, the downlink signal transmitted from the serving cell is considered not to be received on the symbol on which the CLI measurement is performed, and on the one symbol before the symbol.

3. The method of claim 1,
   wherein the capability information is used, by the serving cell, to limit downlink data scheduling for the symbol on which the CLI measurement is performed, and for the one symbol before the symbol on.

4. The method of claim 1,
   wherein the capability information is information related to whether the first UE can simultaneously receive the downlink signal transmitted from the serving cell and the SRS transmitted from the second UE.

5. The method of claim 1,
   wherein the SRS is received based on one antenna port, one symbol and one repetition number.

6. The method of claim 1,
   wherein the performing the CLI measurement includes:
   measuring RSRP (Reference Signal Received Power) based on the SRS.

7. The method of claim 1, further comprising:
   transmitting information related to the measured CLI to the serving cell.

8. A method for performing communication related to measurement, the method performed by a base station and comprising:
   receiving, from a first User Equipment (UE), capability information,
   wherein the capability information indicates a capability of whether the first UE supports Frequency Division Multiplexing (FDM)-ed reception of a downlink signal transmitted from the base station and a Sounding Reference Signal (SRS) transmitted from a second UE,
   wherein based on that the first UE does not support the capability, the first UE is not expected to receive the downlink signal transmitted from the base station on a symbol on which CLI measurement is performed, and on one symbol before the symbol; and
   receiving information related to Cross Link Interference (CLI) measured based on the SRS from the second UE from the first UE.

9. The method of claim 8,
   wherein the capability information is information related to whether the first UE can simultaneously receive the downlink signal transmitted from the base station and the SRS transmitted from the second UE.

10. The method of claim 8, further comprising:
    transmitting downlink data to the first UE based on the capability information.

11. The method of claim 10,
    wherein the downlink data is not transmitted on the symbol on which the CLI measurement is performed, and on the one symbol before the symbol on which the CLI measurement is performed.

12. A first User Equipment (UE) configured to perform a measurement, comprising:
    at least one processor; and
    at least one memory for storing instructions and operably electrically connectable with the at least one processor;
    wherein the at least one processor is configured to execute the instructions to perform operations comprising:
    transmitting, to a serving cell, capability information,
    wherein the capability information indicates a capability of whether the first UE supports a Frequency Division Multiplexing (FDM)-ed reception of a downlink signal transmitted from the serving cell and a Sounding Reference Signal (SRS) transmitted from a second UE; and
    performing CLI (Cross Link Interference) measurement based on the SRS from the second UE,
    wherein based on that the first UE does not support the capability, the first UE is not expected to receive the downlink signal transmitted from the serving cell on a symbol on which the CLI measurement is performed, and on one symbol before the symbol.

13. The first UE of claim 12,
    wherein the first UE is an autonomous driving device that communicates with at least one of a mobile terminal, a network, or an autonomous driving vehicle other than the first UE.

14. The first UE of claim 12,
    wherein the capability information is used, by the serving cell, to limit downlink data scheduling for the symbol on which the CLI measurement is performed, and for the one symbol before the symbol.

15. The first UE of claim 12,
wherein the capability information is information related to whether the first UE can simultaneously receive the downlink signal transmitted from the serving cell and the SRS transmitted from the second UE.

16. The first UE of claim 12,
wherein the SRS is received based on one antenna port, one symbol and one repetition number.

17. The first UE of claim 12,
wherein the performing the CLI measurement includes:
measuring RSRP (Reference Signal Received Power) based on the SRS.

18. The first UE of claim 12, wherein the operations further comprise:
transmitting information related to the measured CLI to the serving cell.

* * * * *